: United States Patent  (10) Patent No.: US 9,351,014 B2
Suzuki et al. (45) Date of Patent: May 24, 2016

(54) MOVING IMAGE ENCODING AND DECODING SYSTEM

(75) Inventors: Yoshinori Suzuki, Saitama (JP); Choong Seng Boon, Yokohama (JP)

(73) Assignee: NTT DOCOMO, INC., Tokyo (JP)

( * ) Notice: Subject to any disclaimer, the term of this patent is extended or adjusted under 35 U.S.C. 154(b) by 1102 days.

(21) Appl. No.: 13/082,132

(22) Filed: Apr. 7, 2011

(65) Prior Publication Data

US 2011/0228853 A1   Sep. 22, 2011

Related U.S. Application Data

(63) Continuation of application No. PCT/JP2009/067334, filed on Oct. 5, 2009.

(30) Foreign Application Priority Data

Oct. 9, 2008   (JP) .................... 2008-263080

(51) Int. Cl.
   *H04N 7/26*   (2006.01)
   *H04N 11/00*   (2006.01)
   (Continued)

(52) U.S. Cl.
   CPC ........... *H04N 19/593* (2014.11); *H04N 19/176* (2014.11); *H04N 19/196* (2014.11); *H04N 19/197* (2014.11); *H04N 19/51* (2014.11)

(58) Field of Classification Search
   CPC ..... H04N 7/50; H04N 5/145; H04N 7/26765; H04N 7/26244; H04N 7/361
   USPC ...................... 375/240.16; 382/238
   See application file for complete search history.

(56) References Cited

U.S. PATENT DOCUMENTS

| 6,259,739 B1 | 7/2001 | Kondo ..................... 375/240.23 |
| 6,289,052 B1 | 9/2001 | Faryar et al. ............. 375/240.16 |

(Continued)

FOREIGN PATENT DOCUMENTS

| JP | 2004-072712 | 3/2004 | ............... H04N 7/32 |
| JP | 2004-336369 | 11/2004 | ............... H04N 7/32 |

(Continued)

OTHER PUBLICATIONS

Extended European Search Report for European Application No. 09819158.8, dated Apr. 29, 2013, 4 pages.

(Continued)

*Primary Examiner* — Jamie Atala
*Assistant Examiner* — On S Mung
(74) *Attorney, Agent, or Firm* — Brinks Gilson & Lione

(57) ABSTRACT

A moving image encoding and decoding system includes moving image encoding and decoding devices that can provide motion vector prediction and encoding of a difference motion vector when a block serving as a candidate of motion vector prediction does not have significant motion information. The moving image encoding device may select a first region from stored already encoded regions. When the selected region does not have a reference frame number, the moving image encoding device can search and select a second region having a determined level of correlation with a template region composed of pixel signals already reproduced from a reference image specified with a reference frame number associated with a target region. The moving image encoding device may produce a prediction motion vector based on the spatial positional relationship between the target region and the selected first or second region, and a difference motion vector can be calculated.

16 Claims, 32 Drawing Sheets

(51) Int. Cl.
*H04N 19/52* (2014.01)
*H04N 19/593* (2014.01)
*H04N 19/196* (2014.01)
*H04N 19/176* (2014.01)
*H04N 19/51* (2014.01)

(56) References Cited

U.S. PATENT DOCUMENTS

| | | | |
|---|---|---|---|
| 6,765,964 B1 | 7/2004 | Conklin | 375/240.14 |
| 7,003,035 B2 | 2/2006 | Tourapis et al. | 375/240.12 |
| 2004/0218674 A1* | 11/2004 | Kondo et al. | 375/240.16 |
| 2004/0223548 A1* | 11/2004 | Kato et al. | 375/240.16 |
| 2005/0163216 A1* | 7/2005 | Boon et al. | 375/240.12 |
| 2007/0110161 A1* | 5/2007 | Saigo et al. | 375/240.16 |

FOREIGN PATENT DOCUMENTS

| | | | |
|---|---|---|---|
| JP | 2008092352 A | * | 4/2008 |
| WO | WO 2007125856 A1 | * | 11/2007 |

OTHER PUBLICATIONS

Sugimoto, K., Kobayashi, M., Suzuki, Y., Kato, S., Boon, C.S., "Inter frame coding with template matching spatio-temporal prediction," IEEE International Conference on Image Processing, ICIP '04, Oct. 24, 2004, vol. 1, pp. 465-468 © 2004 IEEE.

International Search Report for International Application No. PCT/JP2009/067334, dated Dec. 28, 2009, 2 pages.

* cited by examiner

MOVING IMAGE ENCODING AND DECODING SYSTEM

This application is a continuation of PCT/JP2009/067334, filed Oct. 5, 2009, which claims the benefit of the filing date under 35 U.S.C. §119(e) of JP2008-263080, filed Oct. 9, 2008, both of which are incorporated herein by reference.

TECHNICAL FIELD

The present invention relates to a moving image encoding device, a moving image encoding method, a moving image encoding program, a moving image decoding device, a moving image decoding method, a moving image decoding program, a moving image processing system, and a moving image processing method, and particularly relates to prediction encoding of a motion vector associated with inter-frame prediction.

BACKGROUND ART

Compression encoding technology is used to efficiently transmit and store still image and moving image data. The MPEG-1 to 4 and ITU (International Telecommunication Union) H.261 to H.264 systems are widely used for moving images.

In such encoding systems, encoding processing and decoding processing are carried out after dividing an image serving as an encoding target into a plurality of blocks.

SUMMARY OF INVENTION

In motion vector prediction, if the value of the motion vector of the prediction target block is zero, the value of the prediction motion vector is zero. In addition, when a method for producing a prediction signal of a prediction target block is not associated with a motion vector (e.g., intra-picture prediction), the value of the prediction motion vector is zero. When the motion vector of a block serving as a candidate of motion vector prediction does not have significant information in this way, a problem can arise in that improvements in efficiency of motion vector prediction may be difficult or impossible.

Scaling processing may be based on the assumption that a moving velocity between frames is constant. If the practical moving velocity between frames is not constant, a difference motion vector value may become large based on the scaling processing. In this case, the encoding efficiency of the difference motion vector may be lowered.

A moving image encoding and decoding system includes a moving image encoding device, a moving image decoding device, a moving image encoding method, a moving image decoding method, a moving image encoding program, a moving image decoding program, a moving image processing system, and a moving image processing method that can efficiently carry out a motion vector prediction even when a prediction motion vector of a prediction target block is zero, for example.

The moving image encoding device includes: region division means for dividing an input image into a plurality of input image regions, storage means for storing a plurality of already reproduced images as reference images, and motion estimation means for searching for a region having a high correlation with a target region included in the input image that is a processing target in a plurality of reference regions from the plurality of reference images stored in the storage means and producing a motion vector of the target region. In addition, the moving image encoding device may include prediction signal generation means for producing a prediction signal of the target region based on a reference frame number of the target region specifying a reference image searched by the motion estimation means and a motion vector specifying a spatial positional relationship between the target region and a searched region of the reference image, and motion vector prediction means for producing a prediction motion vector from one or more encoded motion vectors and producing a difference motion vector between the motion vector produced by the motion estimation means and the prediction motion vector. A residual signal generation means for producing a residual signal between the prediction signal of the target region and a target pixel signal of the target region, encoding means for encoding the residual signal, the reference frame number, and the difference motion vector produced by the motion vector prediction means, and restoration means for restoring the encoded residual signal, and thereafter adding the resultant signal to the prediction signal so as to produce a reproduction image, and storing the reproduction image in the storage means as a reference image may also be included in the moving image encoding device. The motion vector prediction means selects one region from encoded regions, and when the selected region does not have a reference frame number or the reference frame number of the target region and the reference frame number of the selected region are different, searches for a region having a high correlation with a template region that is composed of already reproduced pixel signals and located around the target region. The pixel signals already reproduced from a reference image specified with the reference frame number associated with the target region. The motion vector prediction means produces the prediction motion vector based on a spatial positional relationship between the searched region and the template region.

The moving image encoding device may set the template region to a target adjacent region composed of already reproduced pixel signals. The target adjacent region may be located adjacent to a target region. Alternatively or in addition, the target adjacent region composed of already reproduced adjacent pixel signals may be located adjacent to a region selected by the motion vector prediction means.

Even when the motion vector of an already reproduced prediction target block adjacent to a target region is zero, or when a prediction method that is not associated with a motion vector is used, motion vector prediction in the target region is efficiently carried out and encoding efficiency can be improved.

In the moving image encoding device, the prediction generation means may further include prediction signal combining means for searching for one or more prediction adjacent regions having a high correlation with a target adjacent region composed of already reproduced adjacent pixel signals and located adjacent to the target region. The pixel signals may be reproduced from a plurality of reference images. The prediction signal combining means may also process the prediction signal of the target region based on the one or more prediction adjacent regions, and the prediction motion vector prediction means may store motion vectors. Each of the motion vectors may specify a spatial positional relationship between a prediction adjacent region searched by the prediction signal combining means and a target adjacent region. One motion vector may be stored for each of the plurality of reference images, and when a prediction signal of the selected region is produced by the prediction signal combining means, a motion vector corresponding to a reference frame number of a target region in the stored motion vectors may be set as the prediction motion vector.

When a prediction signal of a prediction target region is produced by template matching, template matching processing efficiency can be improved by using the motion vector detected in the template matching.

The moving image decoding device includes: data decoding means for decoding encoded data of a difference motion vector, a reference frame number, and a residual signal of a target region that is a processing target from compressed data. The moving image decoding device may also include storage means for storing a plurality of already reproduced images as reference images, residual signal restoration means for restoring a reproduction residual signal from the encoded data of the residual signal, and motion vector prediction means for producing a prediction motion vector from one or more restored motion vectors. The motion vector prediction means may also add the difference motion vector decoded by the data decoding means to the prediction motion vector so as to restore a motion vector. The moving image decoding device may also includes prediction signal generation means for producing a prediction signal of the target region based on the motion vector restored by the motion vector prediction means and the reference frame number of the target region.

Image restoration means for adding the prediction signal to the reproduction residual signal so as to restore a pixel signal of the target region may also be included in the moving image decoding device. The motion vector prediction means may select a region from decoded regions, and when the selected region does not have a reference frame number, or the reference frame number of the target region and the reference frame number of the selected region are different, the motion vector predication means may search for a region having a high correlation with a template region that is composed of already reproduced pixel signals. The template region may be located around the target region. The pixel signals may be already reproduced from a reference image specified with the reference frame number associated with the target region. The motion vector prediction means may also produce the prediction motion vector based on a spatial positional relationship between the searched region and the template region.

The moving image decoding device may set the template region to a target adjacent region composed of already reproduced pixel signals and located adjacent to a target region.

Alternatively, or in addition, the moving image decoding device may set the template region to a target adjacent region composed of already reproduced adjacent pixel signals and located adjacent to a region selected by the motion vector prediction means.

Even when the motion vector of an already reproduced prediction target block adjacent to a target region is zero or when a prediction method that is not associated with a motion vector is used, motion vector prediction in the target region is efficiently performed and encoding efficiency can be improved. As a result, data encoded in such a manner can be decoded.

In the moving image decoding device, the prediction generation means may further include prediction signal combining means for searching for one or more prediction adjacent regions having a high correlation with a target adjacent region composed of already reproduced adjacent pixel signals and located adjacent to the target region. The pixel signals may be reproduced from a plurality of reference images. The prediction generation means may also process the prediction signal of the target region based on the one or more prediction adjacent regions, and the prediction motion vector prediction means may store motion vectors each specifying a spatial positional relationship between a prediction adjacent region searched by the prediction signal combining means and a target adjacent region. One motion vector may be stored for each of the plurality of reference images, and when a prediction signal of the selected region is produced by the prediction signal combining means, a motion vector corresponding to a reference frame number of a target region in the stored motion vectors is preferably set as the prediction motion vector.

When a prediction signal of a prediction target region is produced by template matching, template matching processing efficiency can be improved by using the motion vector detected in the template matching.

The moving image encoding and decoding system as described above may be described as including a moving image encoding method, a moving image decoding method, a moving image encoding program, and a moving image decoding program as described below.

A moving image encoding method of the encoding and decoding system includes: a region division step of dividing an input image into a plurality of input image regions, a motion estimation step of searching for a region having a high correlation with a target region that is a processing target in a plurality of reference regions from a plurality of reference images stored in storage means. The moving image encoding method also includes producing a motion vector of the target region, a prediction signal generation step of producing a prediction signal of the target region based on a reference frame number of the target region specifying a reference image searched in the motion estimation step and a motion vector specifying a spatial positional relationship between the target region and the searched region. A motion vector prediction step of producing a prediction motion vector from one or more encoded motion vectors and producing a difference motion vector between the motion vector produced in the motion estimation step and the prediction motion vector may also be included in the moving image encoding method. The moving image encoding method may further include a residual signal generation step of producing a residual signal between the prediction signal of the target region and a target pixel signal of the target region, an encoding step of encoding the residual signal, the reference frame number, and the difference motion vector produced in the motion vector prediction step, a restoration step of restoring the encoded residual signal, and thereafter adding the resultant signal to the prediction signal so as to produce a reproduction image, and storing the reproduction image in the storage means as a reference image. The motion vector prediction step may select one region from encoded regions, and when the selected region does not have a reference frame number, or the reference frame number of the target region and the reference frame number of the selected region are different, the method may search for a region having a high correlation with a template region. The template region may be composed of already reproduced pixel signals and may be located around the target region. The already reproduced pixel signals may be from the reference image specified with the reference frame number associated with the target region. The motion prediction step producing the prediction motion vector based on a spatial positional relationship between the searched region and the template region.

In the moving image encoding method, the prediction generation step may further include a prediction signal combining step of searching for one or more prediction adjacent regions having a high correlation with a target adjacent region composed of already reproduced adjacent pixel signals from a plurality of reference images. The target adjacent region may be located adjacent to the target region. Processing the prediction signal of the target region may be based on the one or more prediction adjacent regions. The motion vector prediction step may further include storing motion vectors. Each of the motion vectors may specify a spatial positional relationship between a prediction adjacent region searched in the prediction signal combining step and a target adjacent region. One motion vector may be stored for each of the plurality of reference images, and when a prediction signal of the selected region is produced in the prediction signal combining step, a motion vector corresponding to a reference frame number of a target region in the stored motion vectors may be set as the prediction motion vector.

A moving image decoding method of the moving image encoding and decoding system includes: a data decoding step of decoding encoded data of a difference motion vector, a reference frame number, and a residual signal of a target region that is a processing target, where the encoded data is decoded from compressed data. The image decoding method also including a storage step of storing a plurality of already reproduced images as reference images, a residual signal restoration step of restoring a reproduction residual signal from the encoded data of the residual signal, and a motion vector prediction step of producing a prediction motion vector from one or more restored motion vectors and adding the difference motion vector decoded in the data decoding step to the prediction motion vector so as to restore a motion vector. A prediction signal generation step of producing a prediction signal of the target region based on the motion vector restored in the motion vector prediction step and the reference frame number of the target region, and an image restoration step of adding the prediction signal to the reproduction residual signal so as to restore a pixel signal of the target region, and storing the pixel signal as a reference image in storage means may also be included in the image decoding method. The motion vector prediction step selects one region from decoded regions, and when the selected one region does not have a reference frame number, or the reference frame number of the target region and the reference frame number of the selected one region are different, the motion vector prediction step may search for a region having a high correlation with a template region that is composed of already reproduced pixel signals. The template region may be located around the target region. The pixel signals may be from a reference image specified with the reference frame number associated with the target region. The motion vector prediction step may also include producing the prediction motion vector based on a spatial positional relationship between the searched region and the template region.

In the moving image decoding method, the prediction generation step may further include a prediction signal combining step of searching for one or more prediction adjacent regions having a high correlation with a target adjacent region composed of already reproduced adjacent pixel signals. The target adjacent region may be located adjacent to the target region. The pixel signals may be from a plurality of reference images. In addition, the prediction generation step may include processing the prediction signal of the target region based on the one or more prediction adjacent regions, and the prediction motion vector prediction step may include storing motion vectors. Each of the motion vectors may specify a spatial positional relationship between a prediction adjacent region searched in the prediction signal combining step and a target adjacent region. One motion vector may be stored for each of the plurality of reference images, and when a prediction signal of the selected region is produced in the prediction signal combining step, a motion vector corresponding to a reference frame number of a target region in the stored motion vectors may be set as the prediction motion vector.

A moving image encoding program within the moving image encoding and decoding system includes: a region division module for dividing an input image into a plurality of regions, and a motion estimation module for searching for a region having a high correlation with a target region that is a processing target in the plurality of regions from a plurality of reference images stored in storage means and producing a motion vector of the target region. The moving image encoding program may also include a prediction signal generation module for producing a prediction signal of the target region based on a reference frame number specifying a reference image searched by the motion estimation module and a motion vector specifying a spatial positional relationship between the target region and the searched region. In addition, the moving image encoding program may include a motion vector prediction module for producing a prediction motion vector from one or more encoded motion vectors, and for producing a difference motion vector between the motion vector produced by the motion estimation module and the prediction motion vector. The moving image encoding program may further include a residual signal generation module for producing a residual signal between the prediction signal of the target region and a target pixel signal of the target region, an encoding module for encoding the residual signal, the reference frame number, and the difference motion vector produced by the motion vector prediction module, and a restoration module for restoring the encoded residual signal. After restoration of the encoded residual signal, the restoration module may add the resultant signal to the prediction signal so as to produce a reproduction image, and store the reproduction image in the storage means as a reference image. The motion vector prediction module may select one region from encoded regions, and when the selected region does not have a reference frame number, or the reference frame number of the target region and the reference frame number of the selected region are different, the motion vector prediction module may search for a region having a high correlation with a template region composed of already reproduced pixel signals that is located around the target region. The pixel signals may be from the reference image specified with the reference frame number associated with the target region. The motion vector prediction module may produce the prediction motion vector based on a spatial positional relationship between the searched region and the template region.

In the moving image encoding program, the prediction generation module may further include a prediction signal combining module for searching for one or more prediction adjacent regions having a high correlation with a target adjacent region composed of already reproduced adjacent pixel signals and located adjacent to the target region. The pixel signals may be from a plurality of reference images. Processing of the prediction signal of the target region may be based on the one or more prediction adjacent regions. The motion vector prediction module preferably further stores motion vectors. Each of the motion vectors may specify a spatial positional relationship between a prediction adjacent region searched by the prediction signal combining module and a target adjacent region. One motion vector may be stored for each of the plurality of reference images, and when a prediction signal of the selected region is produced by the prediction signal combining module, a motion vector corresponding to a reference frame number of a target region in the stored motion vectors may be set as the prediction motion vector.

A moving image decoding program within the moving image encoding and decoding system includes: a data decoding module for decoding encoded data of a difference motion vector, a reference frame number, and a residual signal of a target region that is a processing target from compressed data. The moving image decoding program also includes a storage module for storing a plurality of already reproduced images as reference images, a residual signal restoration module for restoring a reproduction residual signal from the encoded data of the residual signal, and a motion vector prediction module for producing a prediction motion vector from one or more restored motion vectors and adding the difference motion vector decoded by the data decoding module to the prediction motion vector so as to restore a motion vector. The moving image decoding program further includes, a prediction signal generation module for producing a prediction signal of the target region based on the motion vector restored by the motion vector prediction module and the reference frame number of the target region, and an image restoration module for adding the prediction signal to the reproduction residual signal so as to restore a pixel signal of the target region. The image restoration module also storing the pixel signal as a reference image in storage means. The motion vector prediction module selects one region from decoded regions, and when the selected region does not have a reference frame number, or the reference frame number of the target region and the reference frame number of the selected region are different, the motion vector prediction module searches for a region having high correlation with a template region that is composed of already reproduced pixel signals and that is located around the target region. The pixel signals may be from a reference image specified with the reference frame number associated with the target region, and the motion vector prediction module may produce the prediction motion vector based on a spatial positional relationship between the searched region and the template region.

In the moving image decoding program included in the moving image encoding and decoding system, the prediction generation module may further include a prediction signal combining module for searching for one or more prediction adjacent regions having a high correlation with a target adjacent region composed of already reproduced adjacent pixel signals and that are located adjacent to the target region. The pixel signals may be from a plurality of reference images. The prediction signal combining module may process the prediction signal of the target region based on the one or more prediction adjacent regions, and the prediction motion vector prediction module may store motion vectors. Each of the motion vectors may specify a spatial positional relationship between a prediction adjacent region searched by the prediction signal combining module and a target adjacent region. One motion vector may be stored for each of the plurality of reference images, and when a prediction signal of the selected region is produced by the prediction signal combining module, a motion vector corresponding to a reference frame number of a target region in the stored motion vectors is preferably set as the prediction motion vector.

The moving image encoding and decoding system is an image processing system that includes the above-described moving image encoding device and the above-described moving image decoding device. The system may be structured in such a manner that the moving image decoding device decodes data encoded by the moving image encoding device.

The moving image encoding and decoding system also includes an image processing method that includes the above-described moving image encoding method and the above-described moving image decoding method, and the moving image decoding method decodes data encoded by the moving image encoding method.

With the moving image encoding and decoding system, a motion vector of a target region can be produced by using a region composed of encoded signals around the target region. Therefore, even when a prediction target region adjacent to the target region does not have a motion vector having a significant value, a difference motion vector having a small value can be produced. In addition, even when the moving velocity between frames is not constant, a difference motion vector having a small value can be produced by carrying out searching on a reference image specified with a reference frame number of the target region. Consequently, there is an effect that a prediction motion vector capable of enhancing encoding efficiency can be produced so as to improve encoding efficiency.

BRIEF DESCRIPTION OF DRAWINGS

FIG. 2(A) illustrates an example reference picture while FIG. 2(B) illustrates an example encoding target picture.

FIG. 8(A) illustrates an example reference picture while FIG. 8(B) illustrates an example encoding target picture.

FIG. 9(A) illustrates an example reference picture while FIG. 9(B) illustrates an example encoding target picture.

FIG. 10(A) illustrates an example reference picture while FIG. 10(B) illustrates an example encoding target picture.

FIG. 11(A) illustrates an example reference picture while FIG. 11(B) illustrates an example encoding target picture.

Figure 1:
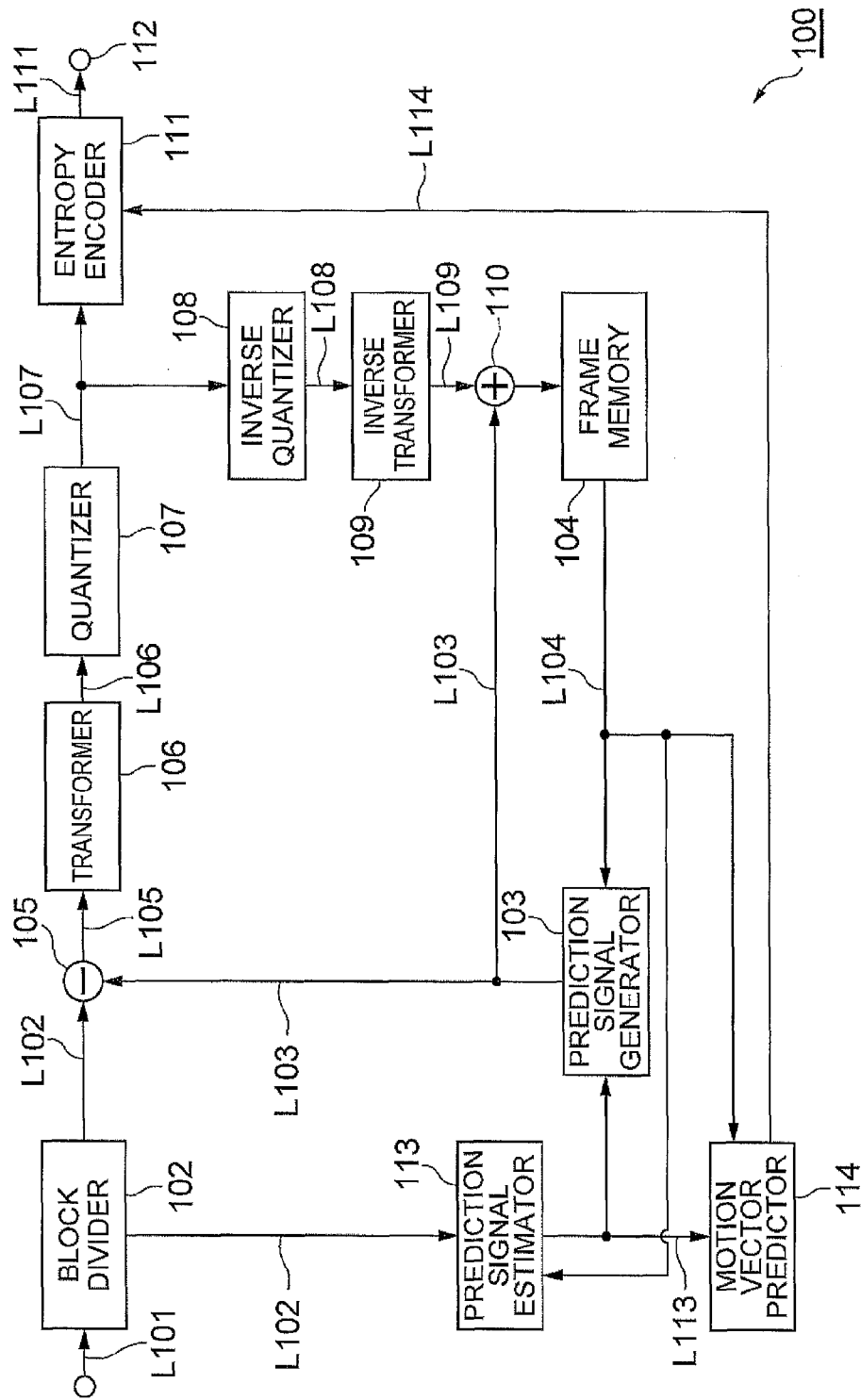
FIG. 1 is a block diagram illustrating an example of a moving image encoding device 100.

REFERENCE SIGNS LIST 10 recording medium
12 reading out device
14 working memory
16 memory
18 display
20 mouse
22 keyboard
24 communication device
30 computer
40 computer data signal
100 moving picture encoding device
101 input terminal
102 block divider
103 prediction signal generator
104 frame memory
105 subtractor
106 transformer
107 quantizer
108 inverse quantizer
109 inverse transformer
110 adder
111 entropy encoder
112 output terminal
113 prediction signal estimator
114 motion vector predictor
201 memory
202 prediction target block selector
203 prediction motion vector searcher
204 difference unit
231 determiner
232 switcher
234 template matcher
240 search region setter
241 target adjacent region acquisition unit
242 prediction adjacent region acquisition unit
243 candidate prediction region selector
301 input terminal
302 entropy decoder
303 inverse quantizer
304 inverse transformer
305 adder
306 output terminal
307 motion vector predictor
312 adder

DESCRIPTION OF EMBODIMENTS

The present embodiment is described below in detail with reference to the accompanying drawings. In the description of the drawings, elements that are the same or equivalent are labeled with the same reference numerals, and the duplicated description thereof is omitted.

In prediction encoding within a picture, a prediction signal is produced by using an adjacent already reproduced image signal (obtained by restoring compressed image data) within the same picture where a target block is included, and thereafter a differential signal obtained by subtracting the prediction signal from a signal of the target block is encoded. In prediction encoding between pictures, referring to an adjacent already reproduced image signal within a different picture from the picture within which the target block is included, motion compensation is carried out, and a prediction signal is produced. The prediction signal is subtracted from the signal of the target block so as to be a differential signal and the differential signal is encoded.

Figure 32:
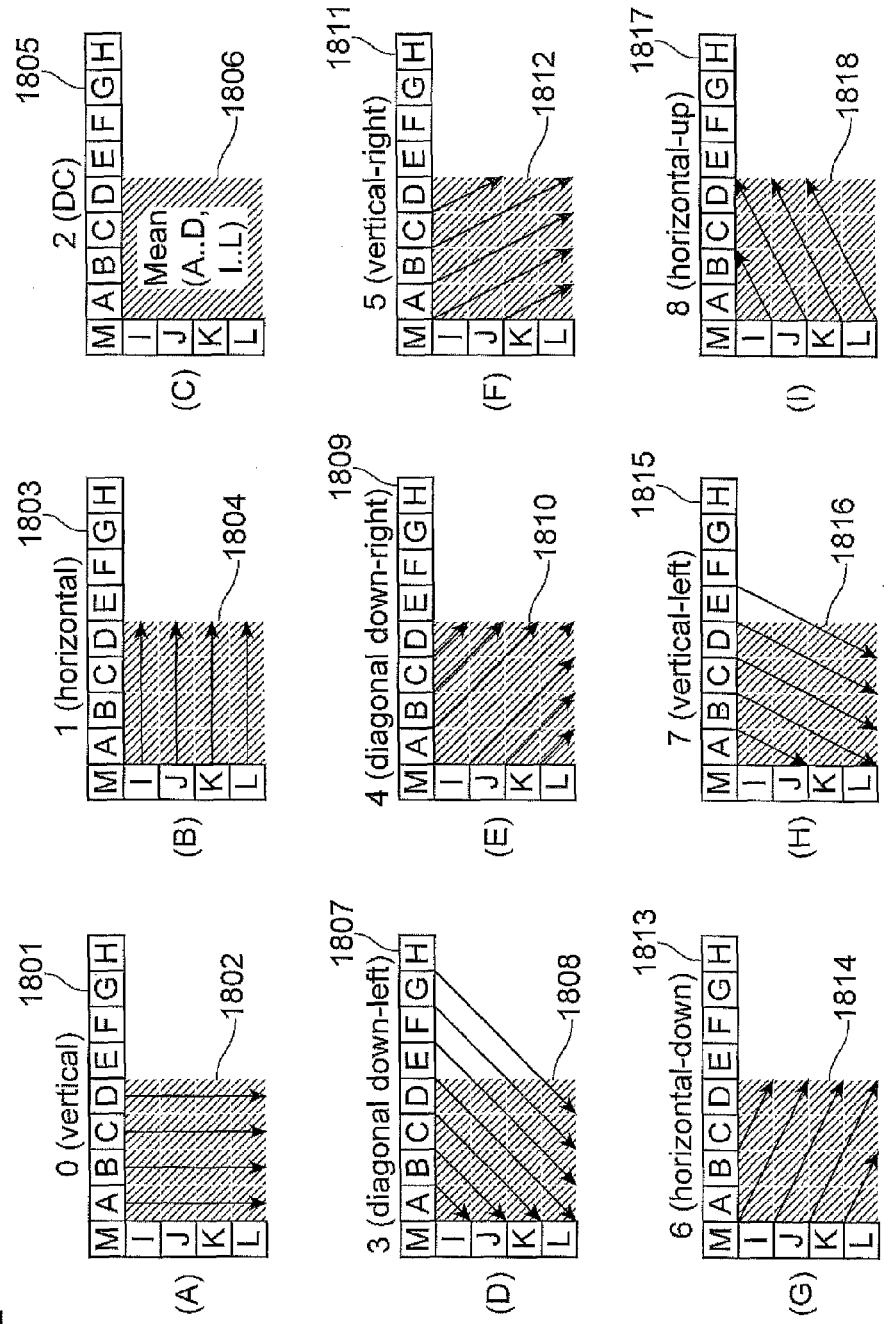
FIG. 32 is a schematic view to describe a prior art intra-picture prediction method.

For example, intra-picture prediction encoding may involve a method in which a prediction signal is produced by extrapolating, in a predetermined direction, already reproduced pixel values adjacent to a block serving as an encoding target. FIG. 32 is a schematic view to describe an example of an intra-picture prediction method. In FIG. 32(A), a target block 1802 is a block that is the target of encoding. A pixel group 1801 is an adjacent region composed of pixels A to M located adjacent to the boundary of the target block 1802. The pixel group 1801 is an image signal that has been already reproduced in a past process.

In this case, the pixel group 1801 that is composed of adjacent pixels directly above the target block 1802 is extended downwards to produce a prediction signal. In FIG. 32(B), the already reproduced pixels (I to L) located on the left of a target block 1804 are extended rightward so as to produce a prediction signal. The difference from the pixel signal of the target block is found for each of the nine prediction signals produced by the method illustrated in FIG. 32(A) to FIG. 32(I) as described above. The prediction signal having the lowest difference value is taken to be the optimal prediction signal.

In inter-picture prediction encoding, a prediction signal may be produced by a method that searches for a signal resembling the pixel signal of a block serving as an encoding target from already reproduced pictures. A motion vector that is the spatial displacement amount between the target block and a region composed of the searched signal, and a residual signal between the pixel signal of the target block and the prediction signal are encoded. The technique of searching for the motion vector for each block in this way may be referred to as block matching.

Figure 2:
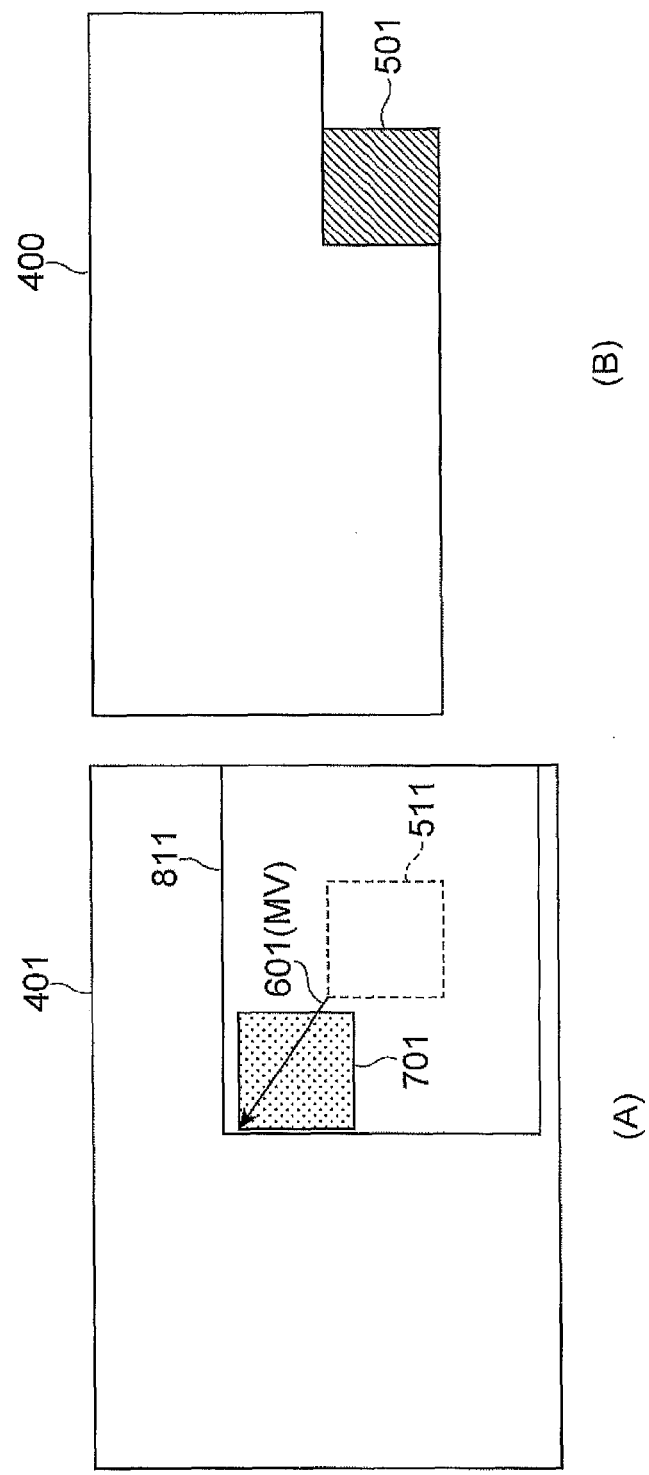
FIG. 2 is a schematic view to describe an example block matching processing.

FIG. 2 is a schematic view to describe an example block matching processing. Here, the procedure for producing a prediction signal of a target block is described by taking as an example a target block 501 on a picture 400 serving as the encoding target. A picture 401 has been already reproduced. A region 511 is a region that is in the same spatial position as the target block 501. In block matching, a search range 811 surrounding the region 511 is set, and a region 701 that has the lowest sum of absolute differences relating to the pixel signal of the target block 501 is detected from the pixel signal of this search range. The signal of the region 701 becomes a prediction signal. The displacement amount from the region 511 to the region 701 is detected as a motion vector 601.

In order to enhance prediction performance, the inter-picture prediction may be carried out with a plurality of already reproduced images as reference images. In this case, the block matching illustrated in FIG. 2 is carried out with respect to a plurality of reference images including the picture 401, and a prediction signal having higher encoding efficiency is detected. In addition, in order to correspond to local feature changes in images, a plurality of prediction types with different block sizes for encoding a motion vector is prepared.

In compression encoding of moving image data, each picture (frame or field) can be encoded in any sequence. Therefore, there are at least three encoding sequence techniques for inter-picture prediction that produces a prediction signal with reference to reproduced pictures. For example, a first technique is a forward prediction that produces a prediction signal with reference to reproduced pictures in the past in the order of reproduction sequence. A second technique, for example, is a backward prediction that refers to reproduced pictures in the future in the order of reproduction sequence. In a third example technique a bidirectional prediction may be carried out that performs both forward prediction and backward prediction so as to average the two prediction signals.

The motion vector detected by inter-picture prediction may be prediction encoded. Specifically, a difference vector between a prediction motion vector produced from the motion vector of an adjacent block and the motion vector of the target block may be encoded. The motion vectors of the already encoded blocks on direct upper, direct left, and upper right of the target block may be set as candidates, and a prediction motion vector may be obtained by finding intermediate values of each horizontal component and vertical component of the motion vectors. Then, information specifying the difference motion vector and the reference image may be encoded.

It may not always be true that the reference frame number associated with the already encoded block (prediction target block) serving as the motion vector prediction candidate and the reference frame number associated with the motion vector of the encoding target are the same. The motion vectors with respect to different reference images can cause their difference values to be large due to different frame intervals. When the reference frame number of a target block and the reference frame number of a prediction target block are not the same, the motion vector of the prediction target block may be scaled on a reference image specified with the reference frame number of the target block, and thereafter the scaled motion vector may be used for motion vector prediction.

FIG. 1 is a block diagram illustrating an example of a moving image encoding device 100, or encoder, included in the moving image encoding and decoding system. The moving image encoding device 100 may be a computing device or computer, including for example software, hardware, or a combination of hardware and software, as described later, capable of performing the described functionality. The moving image encoding device 100 may be one or more separate systems or devices included in the moving image encoding and decoding system, or may be combined with other systems or devices within the moving image encoding and decoding system. In other examples, fewer or additional blocks may be used to illustrate the functionality of the moving image encoding device 100. The moving image encoding device 100 includes an input terminal 101, a block divider 102 (region division means or region division unit), a prediction signal generator 103 (or prediction signal generation unit), a frame memory 104 (storage means), a subtractor 105 (or residual signal generation unit), a transformer 106, a quantizer 107, an inverse quantizer 108, an inverse transformer 109, an adder 110, an entropy encoder 111, an output terminal 112, a prediction signal estimator 113 (motion estimation means, which may also be referred to as a motion estimation unit), and a motion vector predictor 114 (motion vector prediction means, which may also be referred to as a motion vector prediction unit). The transformer 106, the quantizer 107, and the entropy encoder 111 function as encoding means, which may also be referred to as an encoding unit. The inverse quantizer 108, the inverse transformer 109, and the adder 110 function as restoring means, which may also be referred to as a restoring unit or a restoring module. The term "module" or "unit" may be defined to include one or more executable parts of the moving image encoding and decoding system. As described herein, the modules and/or units are defined to include software, hardware or some combination thereof executable by a processor (described later). Software included in the modules and/or units may include instructions stored in the frame memory 104, the memory 201, or any other computer readable storage medium, that are executable by the processor, or any other processor. Hardware included in the modules and/or units may include various devices, components, circuits, gates, circuit boards, and the like that are executable, directed, and/or controlled for performance by the processor.

The input terminal 101 is a terminal to which a signal of a moving image composed of a plurality of images may be input.

The block divider 102 divides an image that is represented by the signal input from the input terminal 101 and is the target of encoding into a plurality of regions. In the present embodiment, the block divider 102 divides the image into a block of a predetermined size, such as composed of 8×8 pixels, and alternatively, may divide the image to have a different block size or shape.

The prediction signal estimator 113 detects additional information included in the block such as a motion vector necessary to produce a prediction signal of a target region (a target block) that is the target of encoding processing. The specific process of the prediction signal estimator 113 is described later.

The motion vector predictor 114 subtracts a prediction motion vector from the motion vector included in the additional information and produces a difference motion vector. The difference motion vector is output to the entropy encoder 111 as additional information. The specific process of the motion vector predictor 114 is described later.

The prediction signal generator 103 produces a prediction signal of the target block based on the additional information input through a line L113 and a reference image that is stored in the frame memory 104 and obtained through a line L104, and outputs the prediction signal to the subtractor 105.

The subtractor 105 is a unit that subtracts the prediction signal from the target block and produces a residual signal. The target block is obtained by division of the image with the block divider 102 and is input to the subtractor 105 through a line L102. The prediction signal is produced by the prediction signal generator 103 and is input through a line L103. The subtractor 105 outputs the residual signal obtained by the subtraction to the transformer 106 through a line L105.

The transformer 106 is a unit that discrete cosine transforms the residual signal obtained by the subtraction. The quantizer 107 is a unit that quantizes a transform coefficient that has been discrete cosine transformed by the transformer 106. The entropy encoder 111 encodes the transform coefficient quantized by the quantizer 107 as well as the additional information included in the residual signal using a prediction method, and outputs the encoded information through a line L111. The output terminal 112 outputs the information input from the entropy encoder 111 to outside the encoder 100.

The inverse quantizer 108 inverse quantizes the quantized transform coefficient. The inverse transformer 109 restores the residual signal by an inverse discrete cosine transform process. The adder 110 adds the restored residual signal to the prediction signal sent from the line L103, reproduces the signal of the target block, and stores the reproduced signal in the frame memory 104. In the present embodiment, the transformer 106 and the inverse transformer 109 are used. Another transform process may be used as alternatives of these transformers. In addition, the transformer 106 and the inverse transformer 109 are not indispensable, and may be omitted. In this way, the compressed pixel signal of the target block is restored and stored in the frame memory 104 as a reference image in order to carry out intra-picture prediction or inter-picture prediction with respect to a subsequent target block.

Next, the prediction signal estimator 113 and the motion vector predictor 114 are described.

The prediction signal estimator 113 carries out a process to determine the prediction method for producing a prediction signal resembling the image signal of the target block that is the target of encoding processing and prediction parameters. The prediction method is generally classified into intra-picture prediction or inter-picture prediction. A plurality of prediction methods may be used to produce candidate prediction signals of the target block and select a prediction signal that is determined to have the highest encoding efficiency.

An intra-picture prediction method is used, for example, as shown in FIG. 32(A), to extend downwards the pixel group 1801 that is adjacent pixels directly above the target block 1802 and in the pixel group 1801 composed of pixels A to M adjacent to the target block 1802 so as to produce a prediction signal. The pixel group 1801 is an image signal that has already been reproduced in past processing. In FIG. 32(B), the already reproduced pixels (I to L) located on the left of the target block 1804 are extended rightward so as to produce a prediction signal. In this way, a predetermined number of candidate prediction signals, such as nine candidate prediction signals can be produced by the methods illustrated in FIGS. 32(A) to 32(I).

An inter-picture prediction method may be used to search a candidate prediction signal resembling a target block that is the target of encoding processing from an already reproduced signal stored in the frame memory 104, and extract motion information necessary to acquire the searched candidate prediction signal from the already reproduced signal. This technique may be referred to as "block matching."

FIG. 2 is a schematic view to describe an example of a block matching processing. Here, the procedure for producing a prediction signal of a target block is described by taking as an example a target block 501 on a picture 400 that is the target of encoding. The picture 401 has been already reproduced. A region 511 is a region that is in the same spatial position as the target block 501. In one example of block matching, a search range 811 surrounding the region 511 is set, and a region 701 that has the lowest sum of absolute differences relating to the pixel signal of the target block 501 is detected from the pixel signal of this search range. The signal of the region 701 becomes a candidate prediction signal. The displacement amount from the region 511 to the region 701 is detected as a motion vector 601. Furthermore, in order to enhance prediction performance, the inter-picture prediction is performed with a plurality of already reproduced images as reference images. Specifically, the block matching illustrated in FIG. 2 may be carried out with respect to a plurality of reference images including the picture 401, and the prediction signal that is determined to have the highest encoding efficiency is detected as a candidate prediction signal.

The prediction signal estimator 113 may find the differences between each of these candidate prediction signals and the pixel signal of the target block and determine the candidate prediction signal having the lowest difference value as an optimal prediction signal. In this case, a code amount needed for encoding the additional information used for producing the prediction signal may be calculated, converted into, and added to the above-described difference value. The additional information includes, in a case of the inter-picture prediction, a reference frame number specifying a motion vector and a detected reference image in addition to the prediction mode based on which the candidate prediction signal has been selected. The additional information including at least one of the reference frame number, the detected reference image and/or the prediction mode may be sent to the prediction signal generator 103 and the motion vector predictor 114.

[Description of the Motion Vector Predictor]

Figure 3:
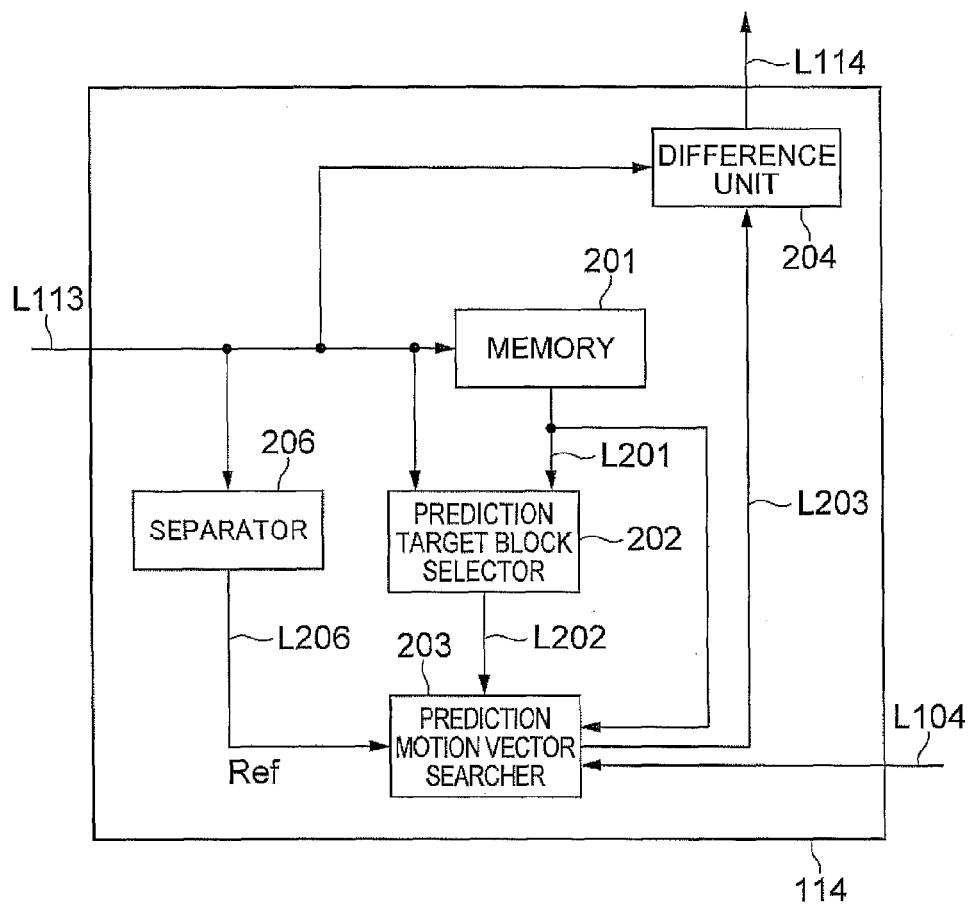
FIG. 3 is a block diagram illustrating an example of a motion vector predictor of FIG. 1.

FIG. 3 illustrates a block diagram of an example of the motion vector predictor 114, or motion vector prediction unit, that carries out motion vector prediction processing of the present embodiment. The motion vector predictor 114 includes a memory 201 that stores input additional information, a prediction target block selector 202, which may also be described as a prediction target block selector unit, a prediction motion vector searcher 203, which may also be described as a prediction motion vector searcher unit, a difference unit 204, and a separator 206, which may also be described as a separator unit.

The input additional information of the block, such as, for example, the prediction mode, the motion vector, and the reference frame number, is stored in the memory 201 through L113, and sent to the separator 206, the prediction target block selector 202, and the difference unit 204. The input additional information may also be referred to as additional information, or block information.

The prediction target block selector 202 selects a block (a prediction target block) used for motion vector prediction from an already reproduced block adjacent to the target block. The process of the prediction target block selector 202 is described by using the example of FIG. 4. A technique is considered herein that selects a prediction target block used for motion vector prediction from two adjacent blocks 502 and 504 adjacent to the target block 501 in an encoding target image. As a block selection method, for example, the difference values are found between the respective components of the motion vector (MV) of the target block and the motion vectors of two adjacent blocks, and one of the two adjacent blocks having the sum of absolute differences smaller than that of the other of the two adjacent blocks is selected. Information for identifying the selected block (such as, for example, information representing a positional relationship with the target block) is included in the additional information as prediction vector selection information and encoded. When the reference frame numbers of the motion vectors of the two adjacent blocks are the same, it is not necessary to encode the prediction vector selection information. For purposes of this example, it is assumed herein that the adjacent block 502 is selected as a prediction target block.

The additional information of the selected adjacent block 502 (prediction target block) is input to the prediction motion vector searcher 203 through L202. At the same time, the separator 206 extracts the reference frame number from the additional information of the target block and inputs the reference frame number to the prediction motion vector searcher 203 through L206. The prediction motion vector searcher 203 compares the reference frame number of the target block 501 with the reference frame number of the prediction target block 502. When the reference frame numbers are the same, the prediction motion vector searcher 203 outputs the motion vector (MVa) of the prediction target block 502 as a prediction motion vector. When the reference frame numbers are different, the prediction motion vector searcher 203 acquires a reference image specified with the reference frame number of the target block 501 through L104. By using the reference image, the prediction motion vector searcher 203 processes the motion vector (MVa) of the prediction target block 502 by scaling processing and the like, and thereafter outputs the processed motion vector to the difference unit 204 as a prediction motion vector. The processing method of the motion vector is described later.

The difference unit 204 finds the differences between the respective components of the motion vector of the target block 501 and the respective components of the prediction motion vector input through L203, and calculates a difference motion vector. In addition, the difference unit 204 outputs the prediction mode, the reference frame number (the reference frame number of the target block 501), the difference motion vector, and the prediction motion vector selection information to the entropy encoder 111 as additional information.

Figure 5:
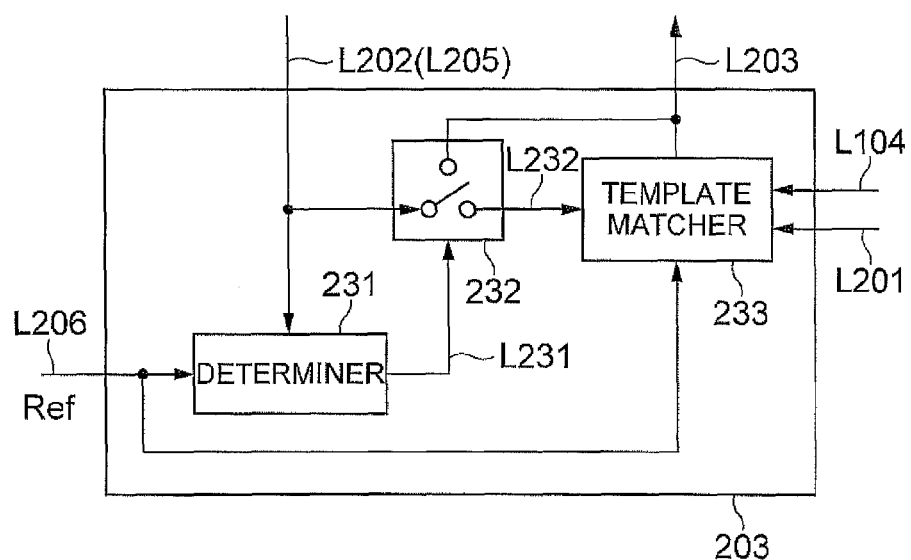
FIG. 5 is a block diagram illustrating an example of a prediction motion vector searcher of FIG. 3.

FIG. 5 illustrates a block diagram of an example of an internal structure of the prediction motion vector searcher 203. The prediction motion vector searcher includes a determiner 231, a switcher 232, and a template matcher 233.

First, the determiner 231 receives, through L206 and L202, the reference frame number of the target block 501 and the reference frame number of the prediction target block 502 that are input, and compares them. When the two reference frame numbers are the same, the determiner 231 sends a control signal to the switcher 232 through L231, and outputs the prediction mode, the reference frame number, the motion vector, and the prediction motion vector selection information that are input through L202 to the difference unit 204 through L203. On the other hand, when the two reference frame numbers are different, the determiner 231 sends a control signal to the switcher 232 through L231, and outputs the prediction mode, the reference frame number, the motion vector, and the prediction motion vector selection information that are input through L202 to the template matcher 233 through L232.

The template matcher 233 searches for a signal region resembling a template region (details are described later) composed of already reproduced pixel signals and located adjacent to the target block from the reference image specified with the reference frame number of the target block 501 by using template matching (through L201). The template matcher 233 calculates a spatial displacement amount between the detected signal region and the template region so as to set the displacement amount as a prediction motion vector.

Figure 6:
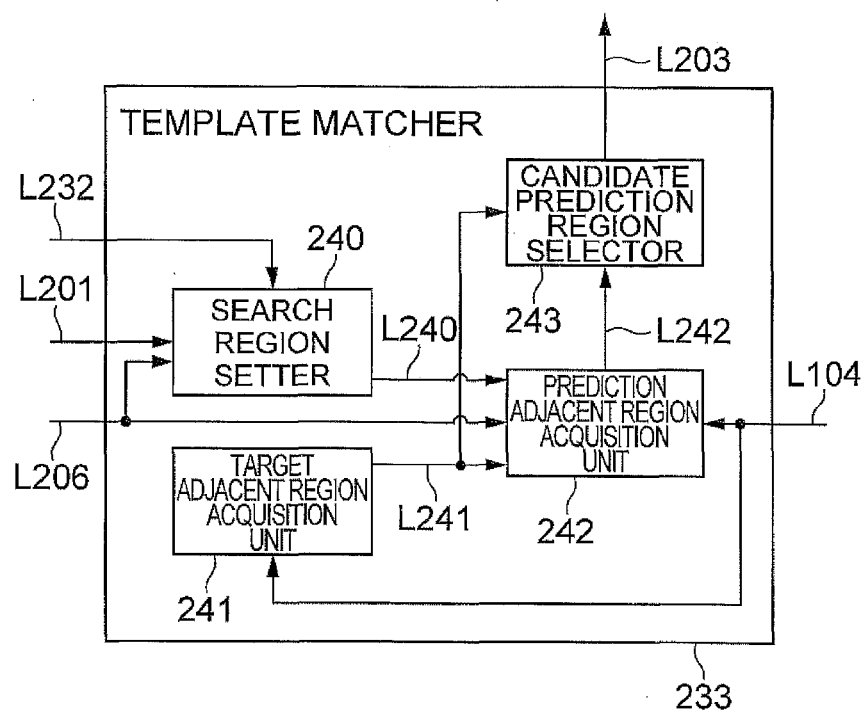
FIG. 6 is a block diagram to describe an example of a template matcher of FIG. 5.
Figure 7:
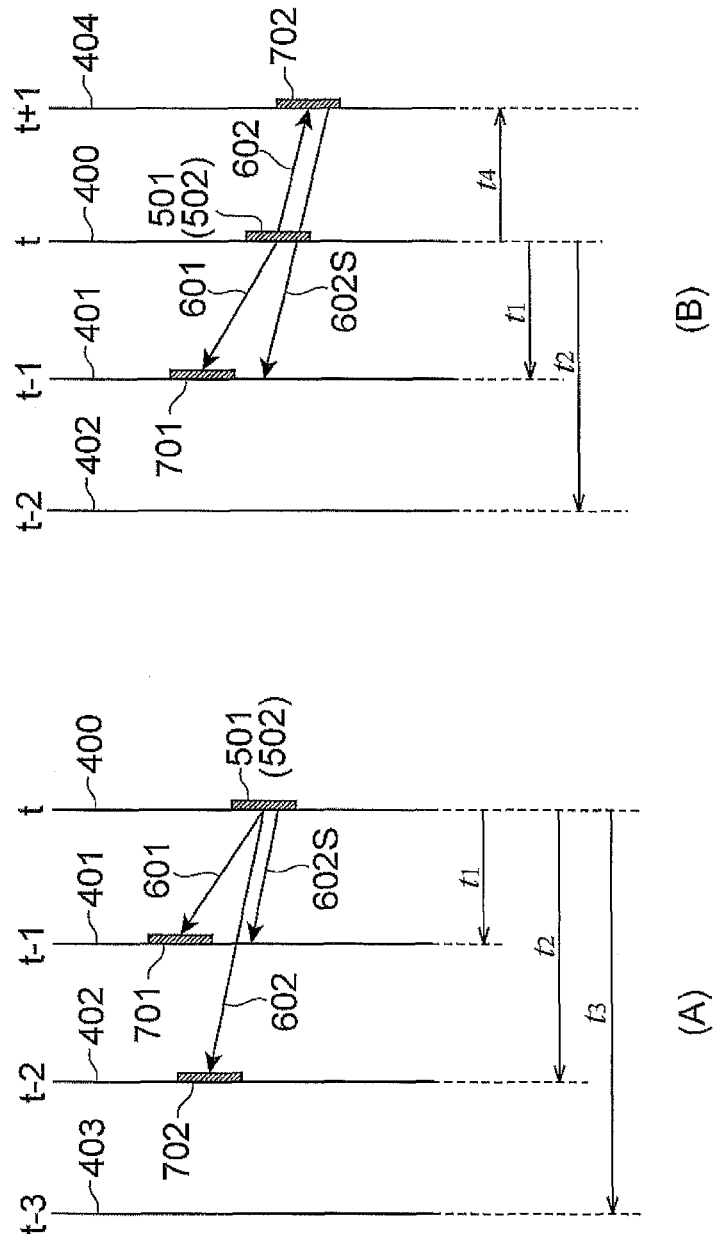
FIG. 7 is a block diagram to describe an example of a scaling processing of a motion vector.
Figure 8:
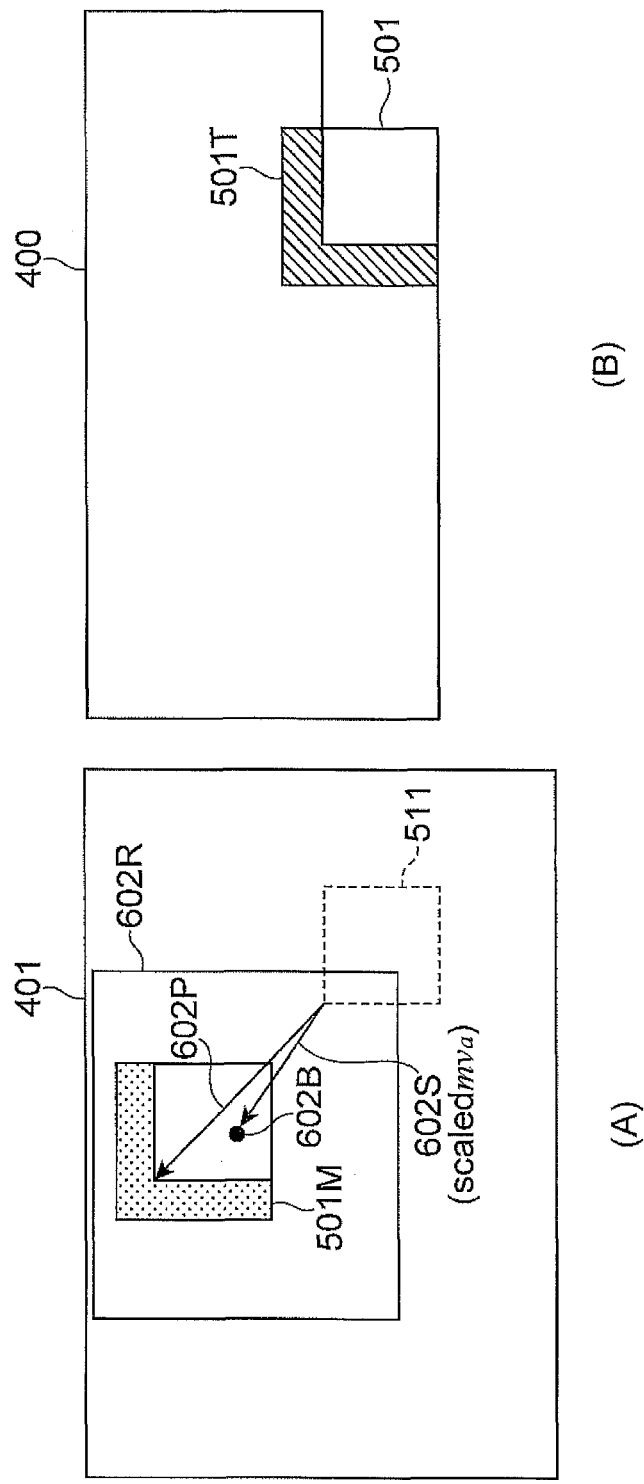
FIG. 8 is a first example of a schematic view relating to template matching processing in prediction motion vector generation processing.

Next, template matching processing in the template matcher 233 is described by using FIGS. 6 to 8.

FIG. 6 illustrates a block diagram of an example of an internal structure of the template matcher 233. The template matcher 233 includes a search region setter 240, a target region acquisition unit 241, a prediction adjacent region acquisition unit 242, and a candidate prediction region selector 243.

In template matching of the present embodiment, after setting a search region for template matching based on the motion vector of the prediction target block (FIG. 7), searching is carried out in the search region so as to detect the signal region resembling the template region (FIG. 8).

In the setting process on a search region in the search region setter 240, first, the motion vector of the prediction target block is scaled on the reference image specified with the reference frame number of the target block 501 by being subjected to scaling processing in a temporal direction. Then, the search region is set around the scaled motion vector serving as the search center. The description is made more specifically.

The prediction mode, the reference frame number, and the motion vector of the prediction target block 502, and the reference frame number of the target block 501 are input to the search region setter 240 through L232 and L206 respectively. The search region setter 240, first, scales a motion vector 602 (MVa) of the prediction target block 502 on the reference image specified with the reference frame number of the target block, and calculates a scaling motion vector 602S (Scaled MVa). Then, as illustrated in the example of FIG. 8, a search center 602B and a search region 602R are set. Specifically, the search region setter 240 sets the search center 602B at the position that is moved from the pixel (the left upper vertex of the block 511) that is located at the spatially same position as the left upper vertex of the target block 501 on the picture 401 (the reference image specified with the reference frame number of the target block 501) by the size of the scaling motion vector 602S, and sets the search region 602R around the search center 602B. The size (search range) of the search region may be determined in advance or encoded on a sequence basis or a picture basis. The transmission of the search range has an effect of reducing costs needed for searching. The horizontal or vertical component value of the scaling motion vector 602S may be a fractional value, such as a half-pixel and a quarter-pixel, or the value may be rounded to an integer value. Information relating to the set search region 602R is output to the prediction adjacent region acquisition unit 424 through L240.

Here, the description on a method for scaling a motion vector is added by using the example of FIG. 7. FIG. 7(A) is an example in which both the reference frame number of the target block 501 and the reference frame number of the prediction target block 502 specify temporally past pictures with respect to the picture 400 that is the target of encoding. In this example, the time of the picture 400 that is the target of encoding is represented as t, the time of the picture 401 specified with the reference frame number of the target block 501 is represented as t−1, and the time of the picture 402 specified with the reference frame number of the prediction target block 502 is represented as t−2. In FIG. 7, a prediction region 701 of the block 501 and the motion vector (MV) 601 are illustrated, and a prediction region 702 of the block 502 and the motion vector (MVa) 602 are illustrated. In the case that the elapsed time between the picture 400 and the picture 401 is t1, and the elapsed time between the picture 400 and the picture 402 is t2, the motion vector 602S (Scaled MVa) obtained by scaling the motion vector 602 (MVa) on the picture 401 can be calculated by: Scaled MVa=(t2×MVax/t1, t2×MVay/t1). Here, MVa=(MVax, MVay).

FIG. 7(B) is an example in which the reference frame number of the prediction target block 502 specifies a temporally future picture with respect to the picture 400 that is the target of encoding. In this example, the time of the picture 404 specified with the reference frame number of the prediction target block 502 is represented as t+1, and the elapsed time between the picture 400 and the picture 404 is represented as t4 (plus and minus of the code are different from t1 and t2). The motion vector 602S (Scaled MVa) obtained by scaling the motion vector 602 (MVa) on the picture 401 can be calculated by: Scaled MVa=(t4×Mvax/t1, t4×MVay/t1).

As aforementioned, the search region 602R for template matching is set on the reference image (401) specified with the reference frame number of the target block 501 based on the scaled motion vector 602S (FIG. 8).

The search region is set by the search region setter 240 in this way, and thereafter, the target adjacent region acquisition unit 241, as illustrated in FIG. 8, acquires a target adjacent region 501T (a template region) that has been already reproduced and adjacent to the target block 501 from the frame memory 104 through L104. The acquired template region is output to the prediction adjacent region acquisition unit 242 and the candidate prediction region selector 243 through L241. While, in the present embodiment, 501T that is the already reproduced pixel group (region having a reversed L-character shape) adjacent to the target block 501 is the target adjacent region, the target adjacent region may be composed of the already reproduced pixels around the target block and the shape and the number of pixels may be arbitrarily set. The shape and the number of pixels may be determined in advance. In this case, the shape and the size (the number of pixels) of the template may be determined on a sequence basis, a picture basis, or a block basis, and may be encoded.

Furthermore, the prediction adjacent region acquisition unit 242 sequentially acquires the pixel group having the same shape as the target adjacent region 501T in the search region from the search region 602R on the reference picture 401 through L104. The acquired pixel groups are output to the candidate prediction region selector 243 through L242.

In addition, the candidate prediction region selector 243 sequentially obtains the sum of absolute differences (SAD) between the target adjacent region 501T input through L241 and the pixel groups that each has the same shape as the target adjacent region 501T and are input through L242, and detects a region 501M (prediction adjacent region) having a determined level of correlation, such as a lowest SAD, between the target adjacent region 501T and one or more of the acquired pixel groups. Lastly, the candidate prediction region selector 243 calculates a spatial displacement amount 602P between the block 511 on the picture 401 (located at the spatially same position as the target block 501) and the searched prediction adjacent region 501M as a prediction motion vector, and outputs the prediction motion vector to the difference unit 204 through L203. The pixel accuracy in the search region 602R may be on an integer pixel basis. The search may also be carried out with decimal fraction pixel accuracy by preparing pixels having decimal fraction accuracy, such as a half-pixel and a quarter-pixel.

In this way, the prediction motion vector 602P of the target block 501 is produced by carrying out a search on the reference image specified with the reference frame number of the target block based on the motion vector 602 of the prediction target block 502 and the target adjacent region 501T adjacent to the target block.

[The Case that the Reference Frame Numbers of a Target Block and a Prediction Target Block are the Same]

While, in the above-described example, the search region for template matching is set by scaling the motion vector 602 of the prediction target block 502 on the reference image specified with the reference frame number, the method for setting a search region is not limited to this technique. For example, the search center may be determined based on the motion vector 602 without scaling the motion vector. In addition, without using the motion vector of the prediction target block, the pixel that is located at the spatially same position (the left upper vertex of the block 511) as the left upper vertex of the target block 501 and on the reference image 401 may be set as the search center. In other words, while scaling processing has an effect of shrinking the search region, scaling processing is not necessarily required for obtaining the effect of the present embodiment. Furthermore, an encoder may determine and encode the method for setting a search center, and explicitly transmit the method to a decoder. Accordingly, encoding of the method for setting a search center and a search range can efficiently reduce costs needed for searching for a prediction motion vector.

While, in the above description, template matching processing is carried out when the reference frame numbers of the target block 501 and the prediction target block 502 are different, carrying out template matching is effective even if the reference frame numbers of two blocks are the same. In other words, there is the effect of making the size of a difference motion vector small and reducing a code amount of a difference motion vector. In this case, scaling processing on the motion vector is not needed since the motion vector of the prediction target block 502 is the motion vector with respect to the reference image specified with the reference frame number of the target block 501.

[Motion Vector Prediction; the Case that the Prediction Mode of a Prediction Target Block is Intra-Picture Prediction]

Figure 4:
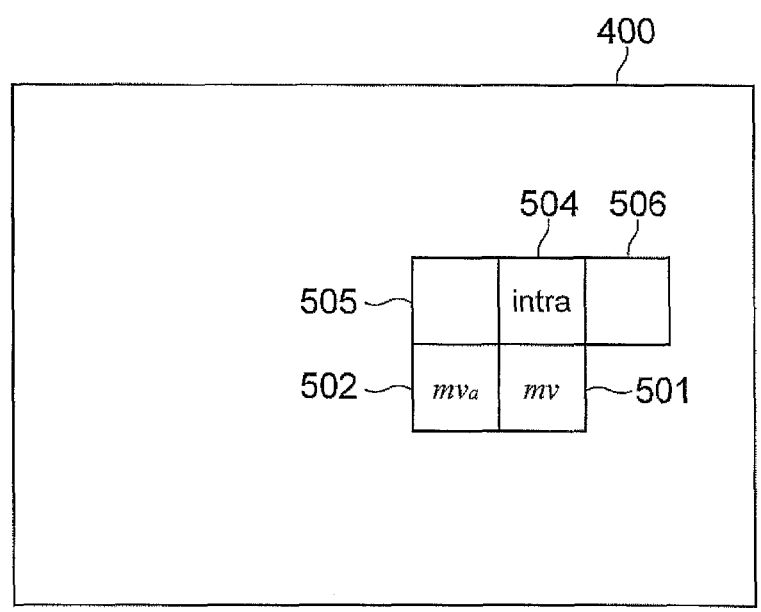
FIG. 4 is a schematic view to describe an example of a relationship between a target block and a prediction target block.

As a different example, a case is considered when a target prediction block of motion vector prediction is an intra block (a prediction signal is produced by intra-picture prediction), i.e., when the prediction target block selector 202 of FIG. 3 selects the block 504 of FIG. 4 as the prediction target block of motion vector prediction. The prediction signal of the block 504 is produced by intra-picture prediction. The additional information of the prediction target block 504 does not include the motion vector and the reference frame number. The prediction target block selector 202 of FIG. 3, the determiner 231 of FIG. 5, and the search region setter 240 of FIG. 6 can identify this information from the prediction mode included in the additional information of the prediction target block 504 (the prediction mode of the prediction target block 504 is intra-picture prediction and the additional information does not include the motion vector and the reference frame number). An example method for setting a search center in this different example is illustrated in FIG. 9 and FIG. 10.

Figure 9:
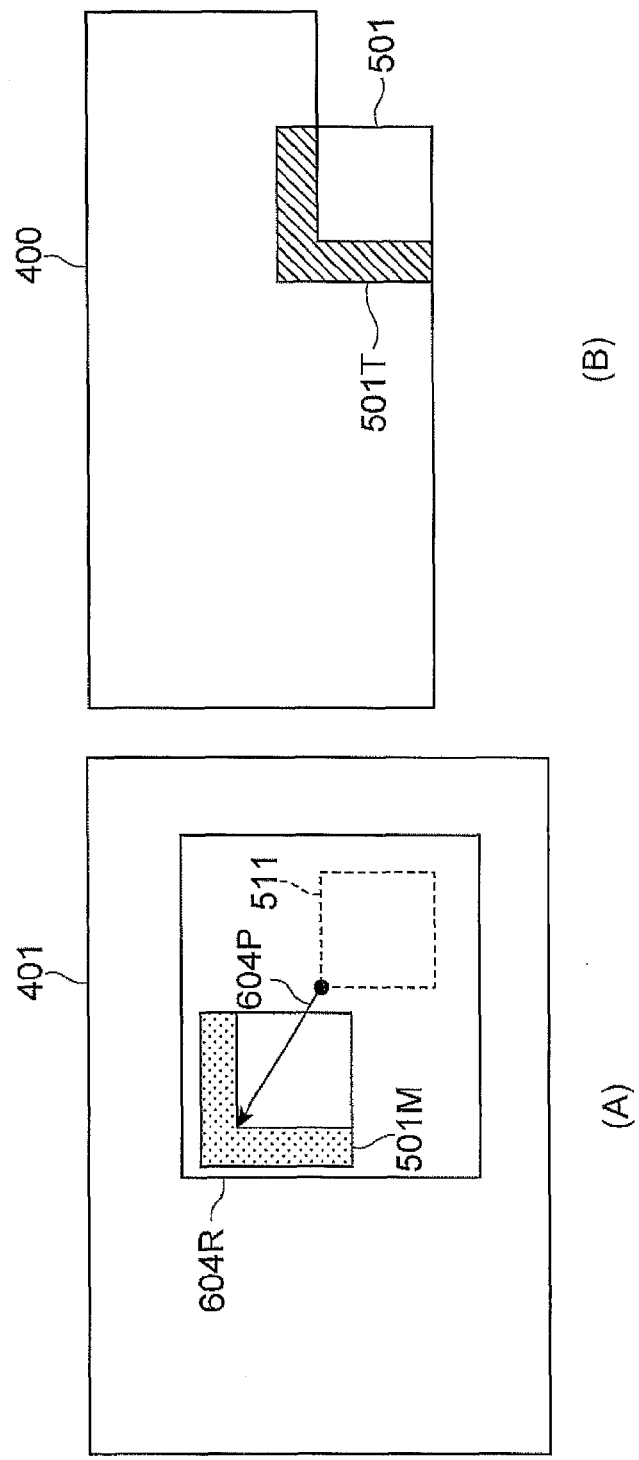
FIG. 9 is a second example of the schematic view relating to template matching processing in prediction motion vector generation processing.

In FIG. 9, it is considered that each component of the motion vector of the prediction target block 504 (refer to FIG. 4) is zero. In this case, since the value remains unchanged even if the motion vector is scaled, the pixel that is located at the spatially same position (the left upper vertex of the block 511) as the left upper vertex of the target block 501 and on the reference image 401 is set as a search center 604P.

Figure 10:
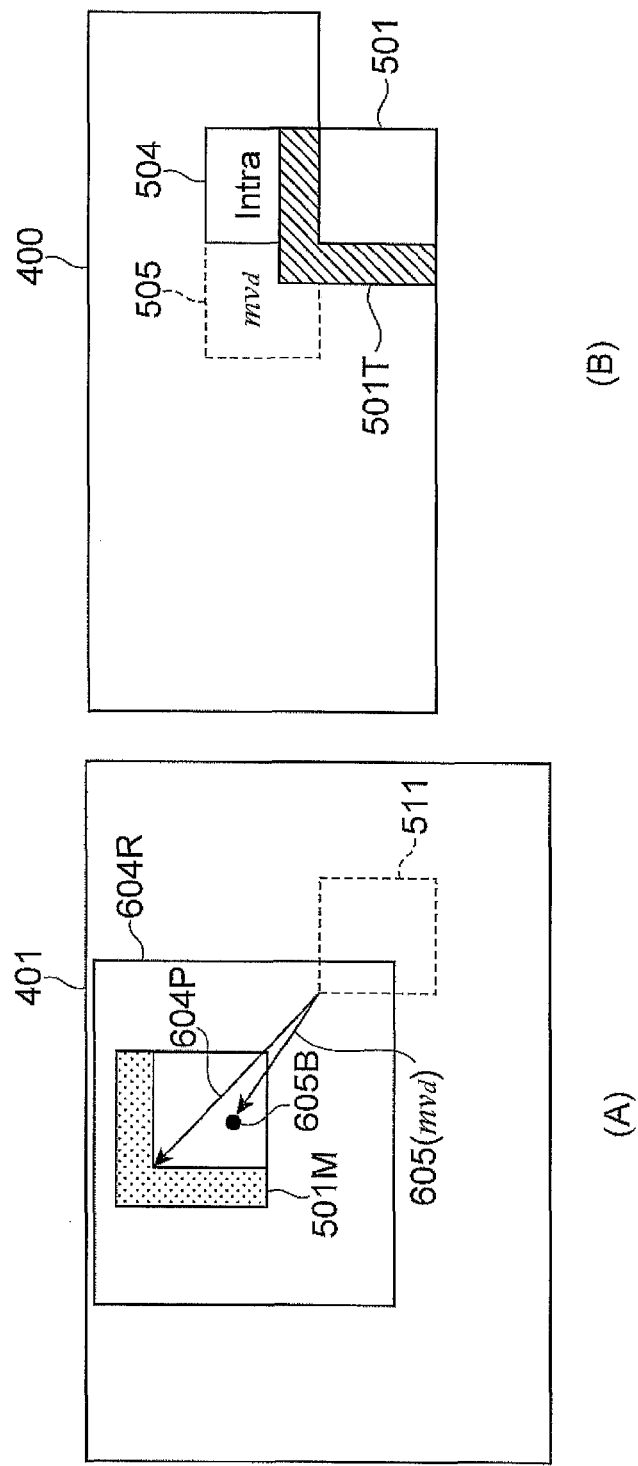
FIG. 10 is a third example of the schematic view relating to template matching processing in prediction motion vector generation processing.

In FIG. 10, a method is considered in which a search center for template matching is determined by using the motion vector of the already encoded block adjacent to the prediction target block 504. It is assumed herein that the reference frame number of a block 505 adjacent to the prediction target block 504 is the same as the reference frame number of the target block 501. In this case, the search region setter 240 acquires the prediction mode of the prediction target block 504 through L232, and acquires the prediction mode, the motion vector, and the reference frame number of the block 505 through L201 (In FIG. 3, the additional information of the block 505 is input to the prediction motion vector searcher 203 from the memory 201 through L201, and subsequently, in FIG. 5, information including them is input to the template matcher 233 through L201). The search region setter 240, as illustrated in FIG. 10, sets a search center 605B and a search region 604R based on a motion vector 605 of the block 505. Specifically, the search region setter 240 sets the search center 605B at the position that is moved from the pixel (the left upper vertex of the block 511) that is located at the spatially same position as the left upper vertex of the target block 501 on the picture 401 (the reference image specified with the reference frame number of the target block 501) by the size of the motion vector 605, and sets the search region 604R around it. Thereafter, the search region setter 240 detects the prediction adjacent region 501M resembling the target adjacent region 501T that is the template region by template matching processing illustrated in FIG. 6, and produces a prediction motion vector 604P. In the example of FIG. 10, the reference frame numbers of the block 505 and the target block 501 are the same in the interest of the simplicity of explanation. However, the reference frame numbers may be different. In this case, the motion vector 505 may be subjected to scaling processing and a search center for template matching may be determined based on the scaled motion vector.

This example can be applied to the case that a prediction signal of a prediction target block is produced by a prediction method that does not include a motion vector. For example, this example can be applied to a prediction method called as a skip block in which a prediction signal in a target block is produced based on predetermined prediction procedures or a prediction motion vector automatically produced.

[Motion Vector Prediction; the Case that an Adjacent Signal of a Prediction Target Block is a Template (Target Adjacent Region)]

Figure 11:
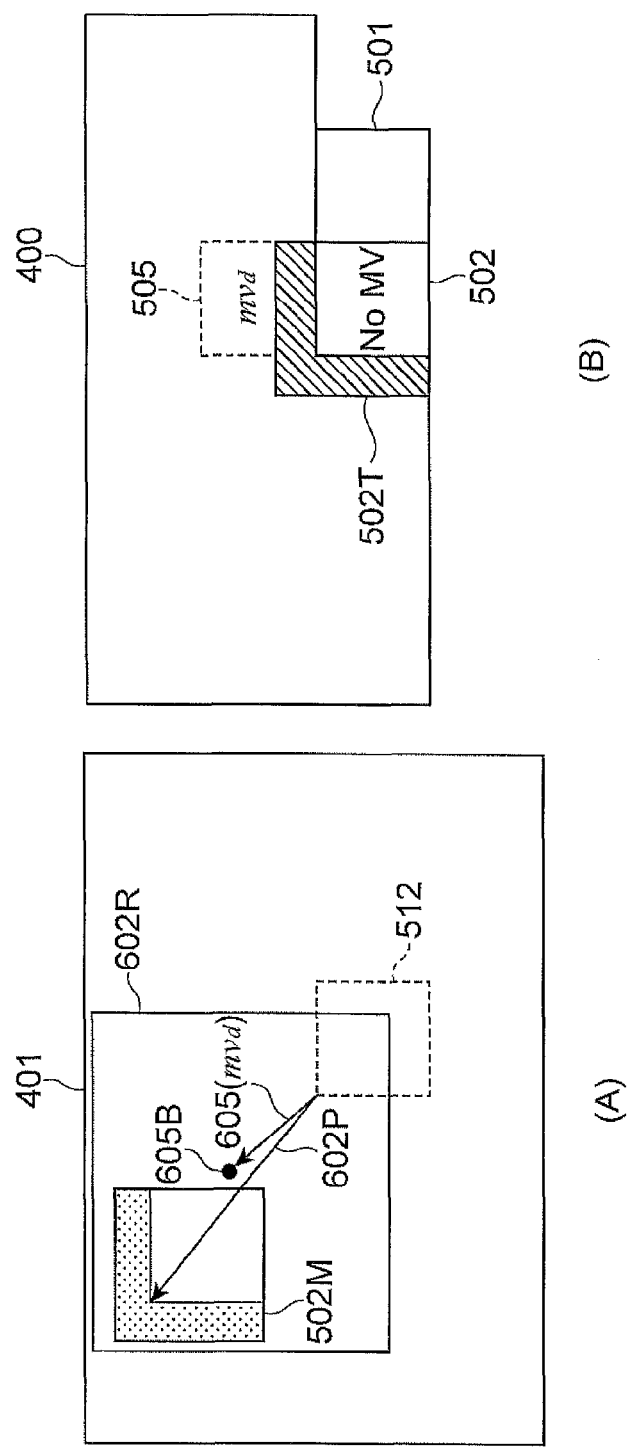
FIG. 11 is a fourth example of the schematic view relating to template matching processing in prediction motion vector generation processing.

While, in the above description, a template (target adjacent region) for template matching is formed with the already reproduced adjacent signals of the target block 501, an adjacent signal of a prediction target block may be set as the template. The description is made with FIG. 11 as an example. In FIG. 11, it is assumed that the prediction target block selector 202 selects the block 502 as a prediction target block for motion vector prediction. It is also considered that the prediction signal of the prediction target block is produced by a prediction method that does not include a motion vector.

When the reference frame number of the block 505 adjacent to the prediction target block 502 and the reference frame number of the target block 501 are the same, the search region setter 240 acquires the prediction mode of the prediction target block 502 through L232 and acquires the prediction mode, the motion vector, and the reference frame number of the block 505 through L201 (in FIG. 3, the additional information of the block 505 is input to the prediction motion vector searcher 203 from the memory 201 through L201, and subsequently, in FIG. 5, information including them is input to the template matcher 233 through L201). The search region setter 240, as illustrated in FIG. 11, sets the search center 605B and the search region 602R based on the motion vector 605 of the block 505. Specifically, the search region setter 240 sets the search center 605B at the position that is moved from the pixel (the left upper vertex of the block 512) that is located at the spatially same position as the left upper vertex of the target block 502 on the picture 401 (the reference image specified with the reference frame number of the target block 501) by the size of the motion vector 605, and sets the search region 602R around it. Information relating to the set search region 602R is output to the prediction adjacent region acquisition unit 424 through L204.

Thereafter, the target region acquisition unit 241 acquires a target adjacent region 502T (template region) that has been already produced and adjacent to the prediction target block 502 from the frame memory 104 through L104 by a predetermined method. The pixel signal of the acquired template region is output to the prediction adjacent region acquisition unit 242 and the candidate prediction region selector 243 through L241.

Furthermore, the prediction adjacent region acquisition unit 242 sequentially acquires the pixel group having the same shape as the target adjacent region 502T in the search region from the search region 602R on the reference picture 401 through L104. The acquired pixel groups are output to the candidate prediction region selector 243 through L242. In addition, the candidate prediction region selector 243 sequentially obtains the sum of absolute differences (SAD) between the corresponding pixels of the target adjacent region 502T input through L241 and the pixel groups that each has the same shape as the target adjacent region 502T and are input through L242, and detects a region 502M having the lowest SAD. Lastly, the candidate prediction region selector 243 calculates the spatial displacement amount 602P between the block 512 on the picture 401 (located at the spatially same position as the prediction target block 502) and the searched prediction adjacent region 502M as a prediction motion vector, and outputs the prediction motion vector to the difference unit 204 through L203.

In the example of FIG. 11, the reference frame numbers of the block 505 and the target block 501 are the same in the interest of the simplicity of explanation. However, the reference frame numbers may be different. In this case, the motion vector 505 may be subjected to scaling processing and a search center for template matching may be determined based on the scaled motion vector. When the block 502 has the motion vector and the reference frame number, a search region for template matching is set by using the motion vector and the reference frame number of the block 502, not the block 505.

[Motion Vector Prediction; the Case that a Prediction Signal of a Prediction Target Block is Produced by Template Matching]

Next, a case is considered in which a prediction signal of a prediction target block is produced by template matching as a different example of the case that the adjacent signal of the prediction target block of the motion vector is set as the template (target adjacent region) as illustrated in FIG. 11. A method for producing a prediction signal by using template matching is written in Patent Literature 5, for example. Patent Literature 5: Japanese Unexamined Patent Application Publication No. 2007-300380.

In this case, in prediction signal generation processing in the prediction signal estimator 113 and the prediction signal generator 103, template matching for a prediction target block has already been carried out on all of the reference images, and a prediction motion vector can be produced by using the search result. The description is specifically made with reference to the examples of FIG. 30 and FIG. 31.

Figure 30:
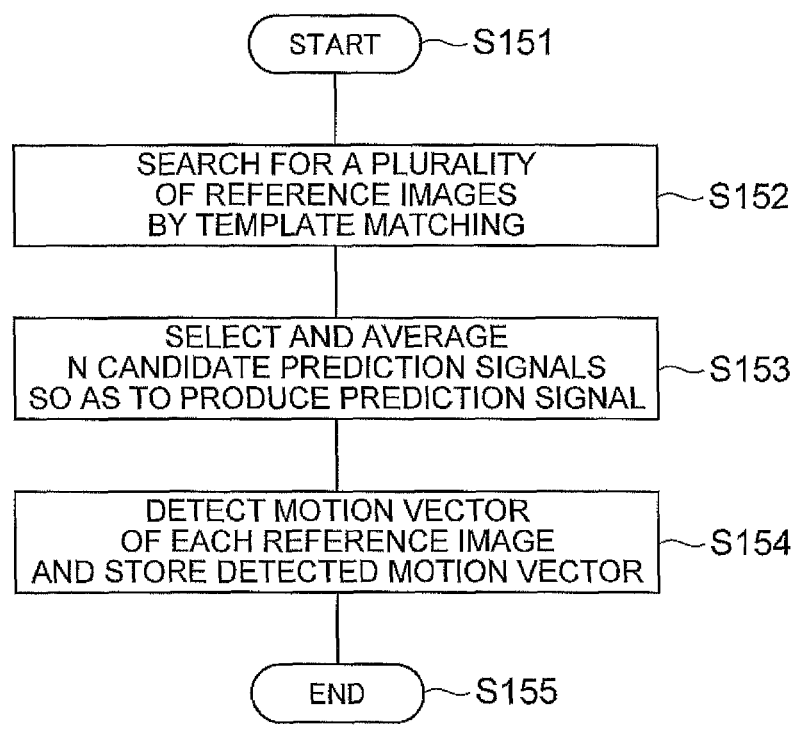
FIG. 30 is a flowchart to describe the procedures of template matching processing carried out by a prediction signal generator.

When the prediction mode selected by the prediction signal estimator 113 of FIG. 2 is a prediction method with template matching, the prediction signal generator 103 carries out the processing illustrated in FIG. 30. In this case, the prediction signal generator 103 functions as prediction signal combining means, which may also be referred to as a prediction signal combining unit.

First, in step 152, a plurality of reference images are searched by template matching using the target adjacent region 501T adjacent to the target block 501. Subsequently, in step 153, N regions having a determined level of correlation, such as a lowest SAD with respect to the target adjacent region 501T are detected. The N candidate prediction signals are averaged so as to produce a prediction signal of the target block 501. In step 154, respective regions having the determined level of correlation, such as the lowest SAD with respect to the target adjacent region 501T are extracted by searching each of the reference images. A spatial displacement amount between the target region 501T and the detected region is stored in the memory 201 of FIG. 3 as a motion vector corresponding to each of the reference images (each reference frame number). In this case, may be necessary to add a data path from the prediction signal generator 103 to the memory 201 of the motion vector predictor 114 in FIG. 1.

Figure 31:
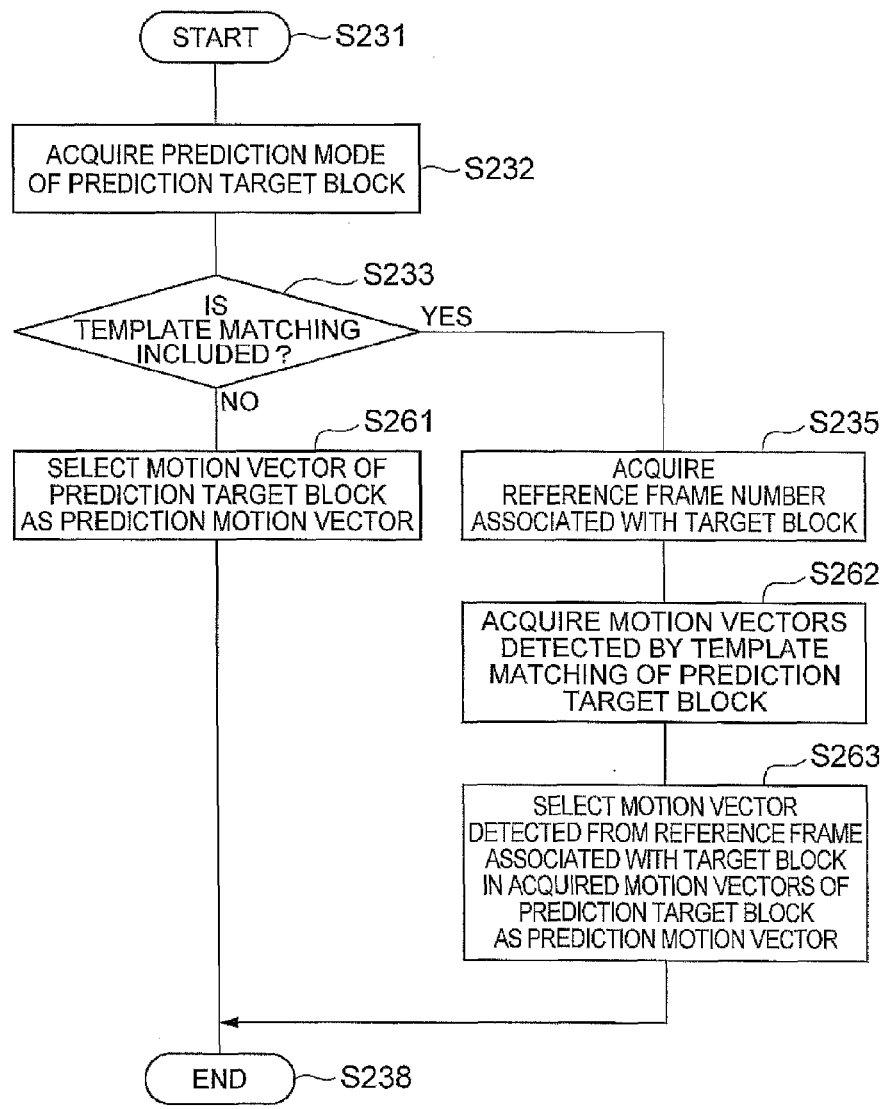
FIG. 31 is a flowchart to describe prediction motion vector determination processing without template matching in a prediction motion vector searcher.

Subsequently, the prediction motion vector searcher 203 carries out the processing illustrated in the example of FIG. 31.

First, the prediction motion vector searcher 203 obtains the prediction mode of the prediction target block through L202 by the determiner 231 (step 232), and determines whether the prediction mode is the prediction mode with template matching or not (step 233). If the prediction mode is not the prediction mode with template matching, the prediction motion vector searcher 203 selects the motion vector of the prediction target block as a prediction motion vector (step 261). In this regard, instead of step 261, the prediction motion vector searcher 203 may produce a prediction motion vector in step 205 described later (described in FIG. 20), i.e., by "template matching based on a motion vector of a block adjacent to a target block" as illustrated in FIG. 4 to FIG. 11.

In the case of the prediction mode with template matching, the determiner 231 acquires the reference frame number of the target block (step 235). Subsequently, the template matcher 233 acquires the motion vectors that are detected in template matching (carried out in FIG. 30) carried out in the prediction signal generation processing of the prediction target block from the memory 201 through L201 (step 262). Lastly, the motion vector corresponding to the reference frame number acquired in step 235 of the target block is detected from the acquired motion vectors of the prediction target block, and is set as a prediction motion vector of the target block (step 263).

When a prediction signal of a prediction target block is produced by template matching in this way, template matching processing costs can be reduced by using motion information detected in the template matching.

[Different Examples of Prediction Target Block Selection Processing]

Types of Prediction Target Blocks.

Figure 12:
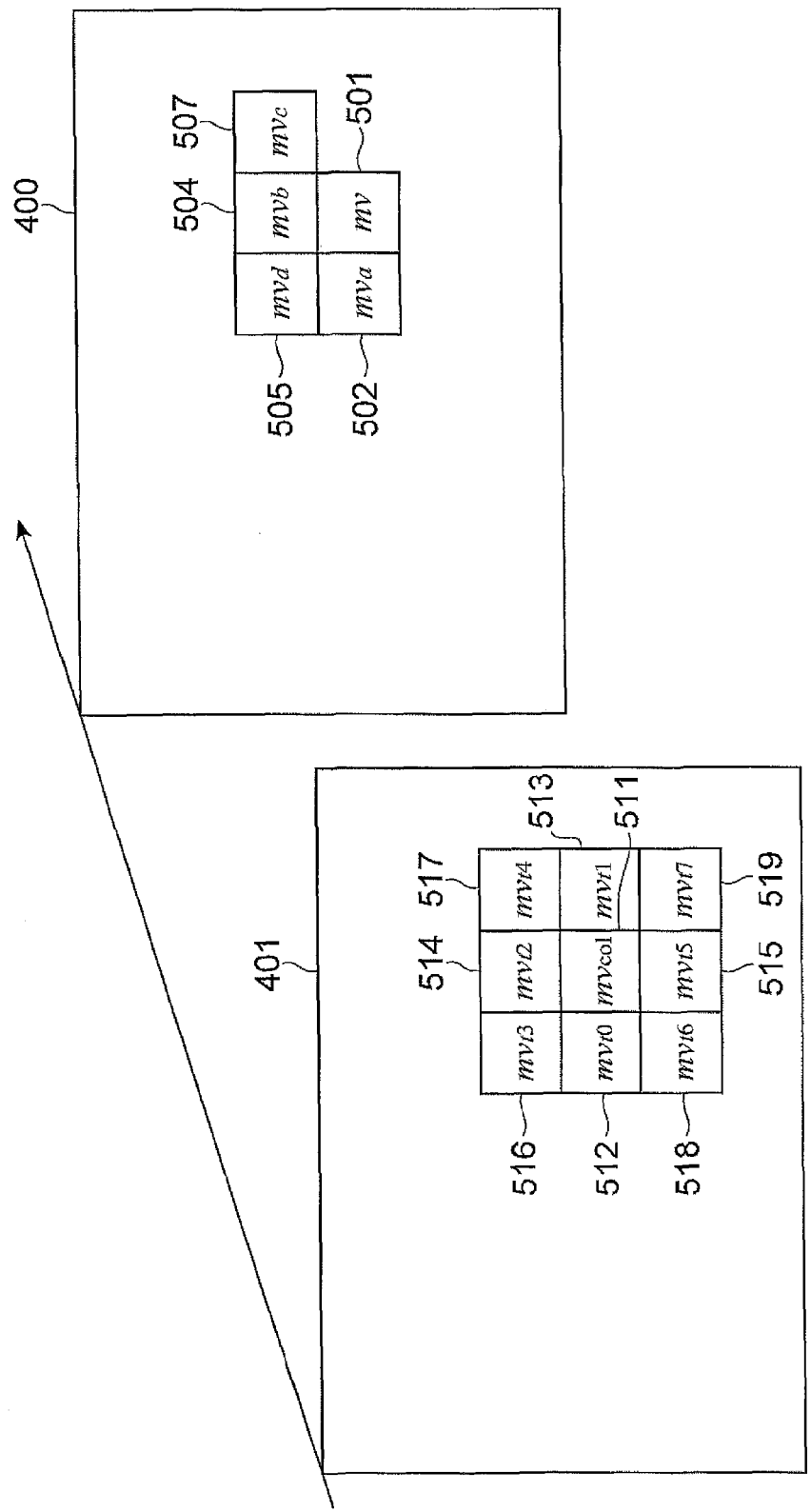
FIG. 12 is an alternative example of the schematic view to describe the relationship between the target block and the prediction target block.

In the above descriptions, the candidate block for the prediction target block is not limited to the block 502 and the block 504. For example, as illustrated in FIG. 12, blocks 502, 504, 505, and 507 adjacent to the target block 501 in the picture 400 may become the candidates, and in addition, the block 511 that is a block in the picture 401 and located at the spatially same position as the target block 501 may be included in the candidates. Furthermore, blocks 512, 513, 514, 515, 516, 517, 518, and 519 adjacent to the block 511 may also be included in the candidates.

Target Block Applicable to Template Matching Processing.

Through the above descriptions, the technique is described in which the prediction target block selector 202 selects a prediction target block, and based on the motion vector of the selected prediction target block, a prediction motion vector of the target block is produced by template matching. As a different method, the motion vectors of a plurality of already encoded blocks adjacent to the target block may be subjected to template matching processing illustrated in FIG. 4 to FIG. 11, and thereafter a prediction motion vector of the target block may be selected. In this case, in FIG. 3, the prediction motion vector searcher 203 is structured between the memory 201 and the prediction target block selector 202. In the method, if the target adjacent region (template) used for template matching processing is fixed, the selection of a prediction target block eventually carries out a process selecting a search center for template matching.

On the other hand, whether template matching is carried out or not may be switched depending on the prediction mode or the position of an adjacent block, or the shape or position (an adjacent signal of a target block or an adjacent signal of an adjacent block) of a target adjacent region (template) used for template matching processing may be switched. In addition to these, the position of a template may be switched based on the correlation between an adjacent block and its adjacent signal.

Selection Methods of a Prediction Target Block.

The selection method of a prediction target block is also not limited to the method in which an encoding device selects a prediction target block and explicitly notifies a decoding device as prediction motion vector selection information. By using the motion vector produced by template matching based on the motion vectors of a plurality of adjacent blocks adjacent to the target block, the scaling motion vector of the adjacent block, or the motion vector of the adjacent block, a prediction motion vector may be produced by calculation. In this case, encoding of the prediction motion vector selection information is not needed.

With a predetermined technique, a prediction target block may be automatically selected from the motion vectors of a plurality of adjacent blocks. For example, the median values of the motion vectors of the blocks 502, 504, and 507 may be selected for each component of the motion vectors.

Automatic selection of a motion vector and encoding of prediction motion vector selection information may be combined. For example, a plurality of combinations of three blocks is set from 13 adjacent blocks illustrated in the example of FIG. 12, and one block is selected from each combination by median value prediction. Then, one combination is selected from the plurality of combinations, and its selected information is encoded as prediction motion vector selection information. In this case, the prediction motion vector searcher 203 determines a search region for template matching based on the selected motion vector.

Figure 13:
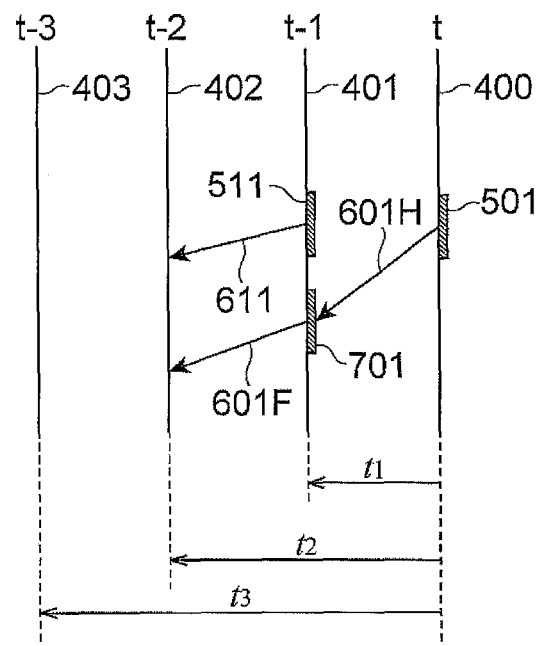
FIG. 13 is a schematic view to describe an example of motion vector extension processing in a temporal direction in prediction motion vector generation processing.

In addition to this, as illustrated in the example of FIG. 13, a motion vector may be extended based on a median value motion vector 601H (the reference frame number specifies the reference picture 401) produced with the motion vectors of the blocks 502, 504, and 507 by median value prediction. In other words, a method is also considered in which a motion vector 601F at a block position 701 on the picture 401 specified with the motion vector 601H is added. In this case, a search region for template matching is determined based on the motion vector produced with 601H+601F. In addition, a search region for template matching may be determined based on the motion vector produced with 601H+611 by adding a motion vector 611 of the block 511 to the median value motion vector 601H.

In this way, with the motion vector predictor 114 of the present embodiment, a prediction motion vector can be corrected to a motion vector with respect to a reference image specified with a reference frame number of a target block by using template matching. As a result, there is an effect that a difference motion vector value becomes small and encoding efficiency of a difference motion vector improves.

Figure 14:
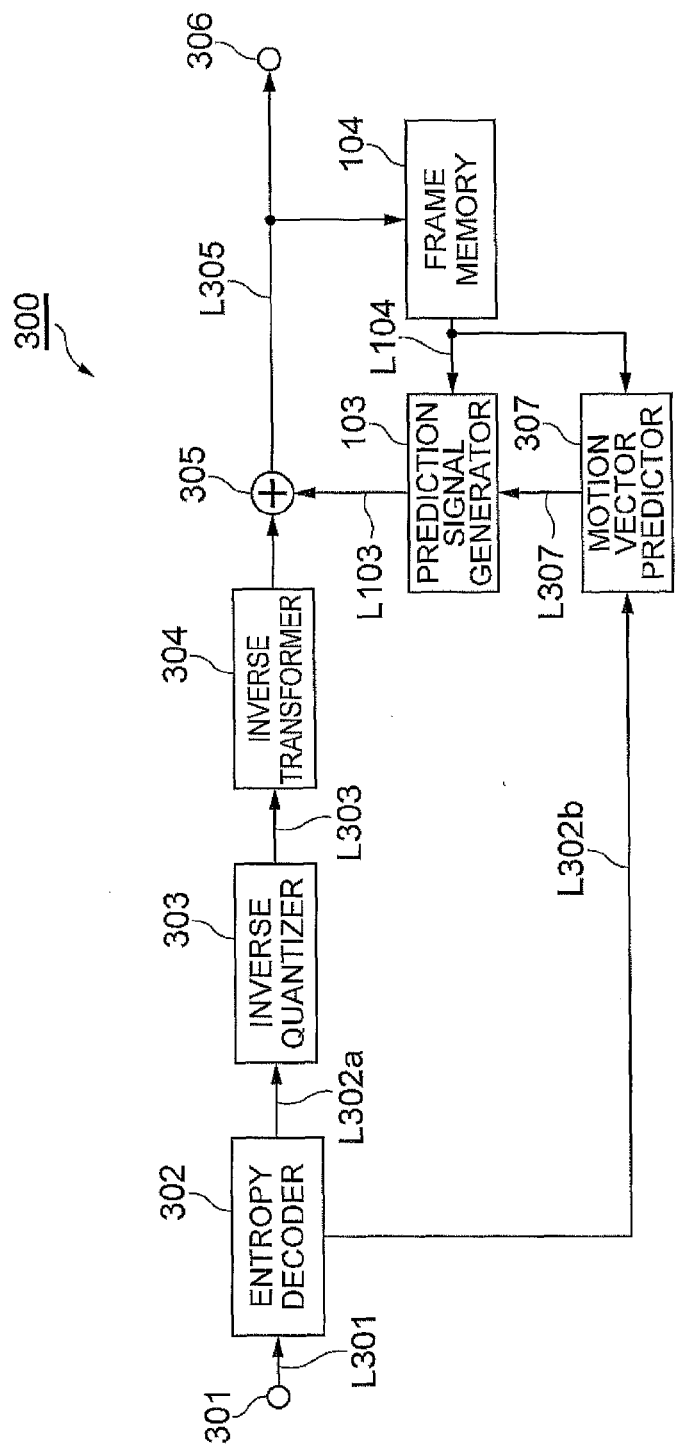
FIG. 14 is a block diagram illustrating an example of a moving image decoding device according to the present embodiment.

A moving image decoding device 300 according to motion vector prediction processing is also included in the moving image encoding and decoding system. The moving image decoding device 300 may be a computing device or computer, including for example software, hardware, or a combination of hardware and software, as described later, capable of performing the described functionality. The moving image decoding device 300 may be one or more separate systems or devices included in the moving image encoding and decoding system, or may be combined with other systems or devices within the moving image encoding and decoding system. In other examples, fewer or additional blocks may be used to illustrate the functionality of the moving image decoding device 300. FIG. 14 is a block diagram illustrating an example of the moving image decoding device 300 according to motion vector prediction processing of the present embodiment. The moving image decoding device 300, which may also be referred to as a restoration unit, includes an input terminal 301, an entropy decoder 302, an inverse quantizer 303, an inverse transformer 304, an adder 305, an output terminal 306, the frame memory 104, the prediction signal generator 103, and a motion vector predictor 307, which may also be referred to as a motion vector prediction unit. Decoding means with the inverse quantizer 303 and the inverse transformer 304 may be carried out by using any unit other than these units.

The input terminal 301 receives compressed data that is compression-encoded by the moving image encoding device described above. The compressed data includes residual signal information and additional information obtained by predicting and encoding a target block that is one of a plurality of blocks divided from an image. Here, the additional information includes a prediction mode that identifies intra-picture prediction, inter-picture prediction, or the like, a difference motion vector, a reference frame number, and prediction motion vector selection information. In addition to these, information relating to a size of a search region, a setting method of a search center, a shape or position of a template in template matching may be included.

The entropy decoder 302 entropy-decodes the compressed data input to the input terminal 301 so as to extract the residual signal information and the additional information of the target block.

The inverse quantizer 303 receives the residual signal information of the target block through a line L302a, and inverse-quantizes the information. The inverse transformer 304 inverse discrete cosine transforms the inverse quantized data so as to restore the residual signal of the target block.

The motion vector predictor 307 receives the additional information from the entropy decoder 302 through a line L302b. The motion vector predictor 307 produces a prediction motion vector based on the prediction motion vector selection information included in the additional information. Then, the motion vector predictor 307 adds the prediction motion vector to the difference motion vector so as to reproduce the motion vector of the target block. The reproduced motion vector is input to the prediction signal generator 103 together with the prediction mode and the reference frame number through L307. The specific process of the motion vector predictor 307 is described later.

The prediction mode, the reference frame number, and the motion vector are input to the prediction signal generator 103 through L307. The prediction signal generator 103 acquires a reference image from the frame memory 104 based on the information including them and produces a prediction signal. The prediction signal generator 103 outputs the produced prediction signal to the adder 305 through the line L103.

The adder 305 adds the prediction signal produced by the prediction signal generator 103 to the residual signal restored by the inverse quantizer 303 and the inverse transformer 304 so as to produce a reproduction pixel signal of the target block, and outputs the reproduction pixel signal to the output terminal 306 and the frame memory 104 through a line L305. The output terminal 306 outputs the signal to an outside (for example, a display).

The frame memory 104 stores the reproduction image output from the adder 305 as a reference reproduction image for subsequent decoding processing.

Figure 15:
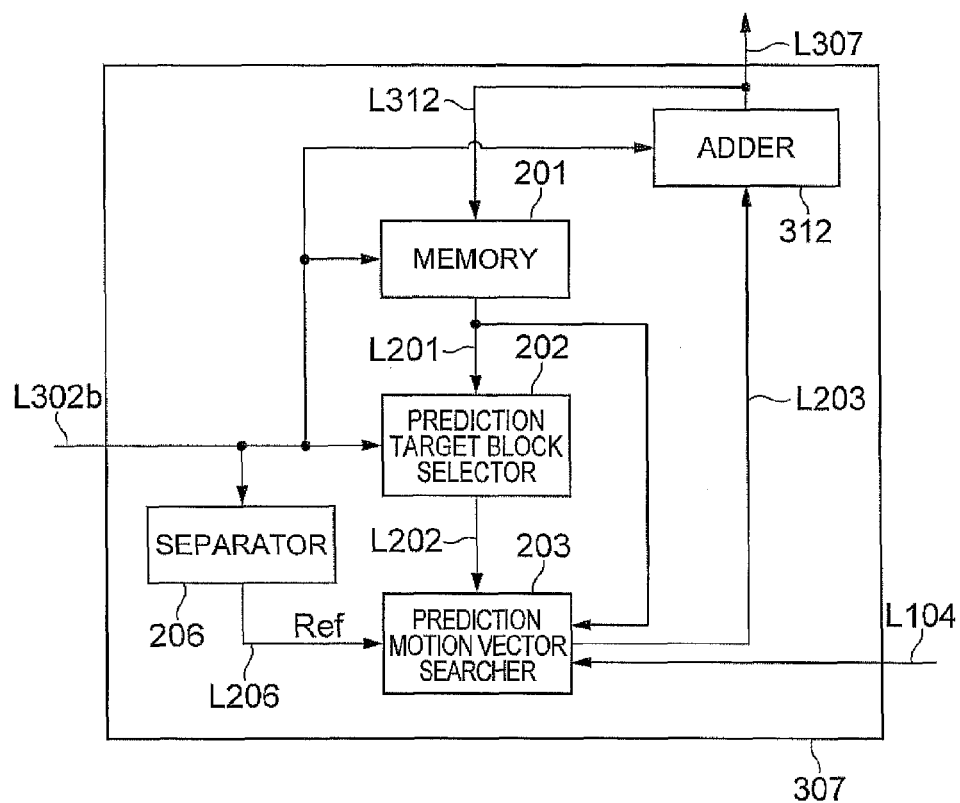
FIG. 15 is a block diagram illustrating an example of a motion vector predictor of FIG. 14.

FIG. 15 illustrates a block diagram of an example of the motion vector predictor 307 that carries out motion vector prediction processing of the present embodiment. The motion vector predictor 307 includes the memory 201 that stores input additional information, the prediction target block selector 202, the prediction motion vector searcher 203, an adder 312, and the separator 206.

The operation of the motion vector predictor 307 is basically the same as the motion vector predictor 114 of FIG. 3. The motion vector predictor 307 differs from the motion vector predictor 114 of FIG. 3 in that the motion vector included in the input additional information is replaced with the difference motion vector and the difference unit 204 is replaced with the adder 312.

In other words, the input additional information, i.e., the prediction mode, the difference motion vector, and the reference frame number, is stored in the memory 201 through L302b, and sent to the separator 206, the prediction target block selector 202, and the adder 312.

The separator 206 extracts the reference frame number from the additional information of the target block and inputs the reference frame number to the prediction motion vector searcher 203 through L206.

The prediction target block selector 202 selects a block (a prediction target block) used for motion vector prediction from an already reproduced block adjacent to the target block.

The prediction motion vector searcher 203 compares the reference frame number of the target block 501 with the reference frame number of the prediction target block 502. When the reference frame numbers are the same, the prediction motion vector searcher 203 outputs the motion vector (MVa) of the prediction target block 502 as a prediction motion vector. When the reference frame numbers are different, the prediction motion vector searcher 203 acquires a reference image specified with the reference frame number of the target block 501 through L104. By using the reference image, the prediction motion vector searcher 203 processes the motion vector (MVa) of the prediction target block 502 by scaling processing and the like, and thereafter outputs the processed motion vector to the adder 312 as a prediction motion vector.

The adder 312 adds the difference motion vector input through L302a to the prediction motion vector input through L203 so as to reproduce the motion vector of the target block. The reproduced motion vector is output to the prediction signal generator 103 together with the prediction mode and the reference frame number through L307. The reproduced motion vector is also output to the memory 201 through L312, and replaced with the difference motion vector input through L302b.

The operations of the memory 201, the prediction target block selector 202, the prediction motion vector searcher 203, and the separator 206 are the same as the content described in the "description of motion vector predictor 114", and the brief overview is as described above. Thus, the detailed descriptions thereof are omitted. "The case that the reference frame numbers of a target block and a prediction target block are the same", "motion vector prediction; the case that the prediction mode of a prediction target block is intra-picture prediction", "motion vector prediction; the case that an adjacent signal of a prediction target block is a template (target adjacent region)", "motion vector prediction; the case that a prediction signal of a target prediction block is produced by template matching", and a modification described in the "different example of prediction target block selection processing" are all applicable. However, when a prediction signal of a target prediction block is produced by template matching, a data path from the prediction signal generator 103 to the memory 201 of the motion vector predictor 307 is needed.

Figure 16:
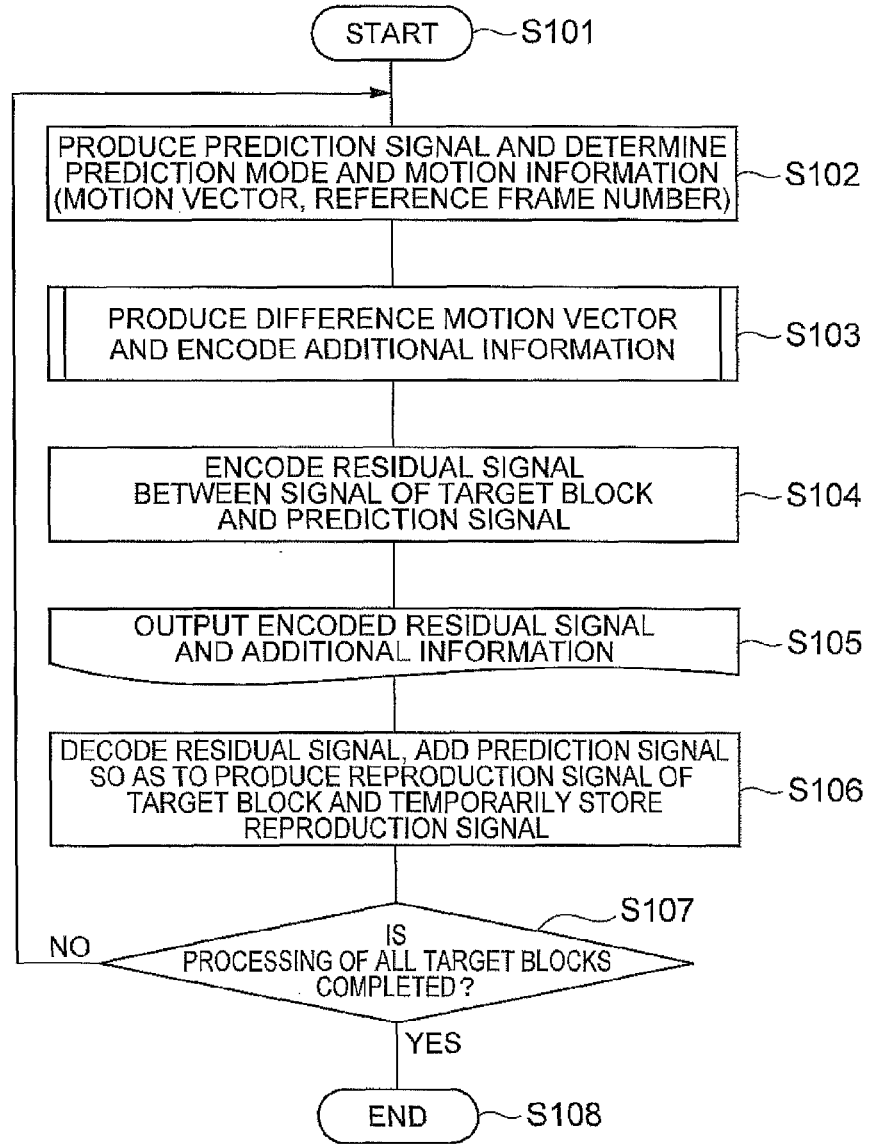
FIG. 16 is a flowchart illustrating an example of the procedures of a moving image encoding method according to the present embodiment.

FIG. 16 is a flowchart illustrating example procedures of a moving image encoding method in the moving image encoding device 100 according to motion vector prediction processing of the present embodiment. First, the prediction signal estimator 113 determines additional information, such as a motion vector, necessary for producing a prediction signal of a target block that is the target of encoding processing, and based on the additional information, the prediction signal generator 103 produces the prediction signal (step 102). The additional information includes a prediction mode that specifies intra-picture prediction (FIG. 32) or inter-picture prediction (FIG. 2), a motion vector, and a reference frame number.

The motion vector predictor 114 subtracts a prediction motion vector from the motion vector included in the additional information and produces a difference motion vector. The difference motion vector is encoded by the entropy encoder 111 as part of the additional information (step 103). The detail of step 103 is described later.

The subtractor 105 subtracts the prediction signal from the pixel signal of the target block so as to produce a residual signal. The produced residual signal is compressed to a quantized transform coefficient by the transformer 106 and the quantizer 107, and encoded by the entropy encoder 111 (step 104). Then, the encoded residual signal and the additional information are output through the output terminal 112 (step 105).

After or in parallel with these processes, the encoded residual signal (quantized transform coefficient) is decoded by the inverse quantizer 108 and the inverse transformer 109. Then, the adder 110 adds the prediction signal to the decoded residual signal so as to reproduce the signal of the target block, and the reproduced signal is stored in the frame memory 104 as a reference picture (step 106). If the processes of all target blocks are not completed, the flow returns to step 102 to process a subsequent target block. If the processes of all target blocks are completed, the process ends (step 107 and step 108).

Figure 17:
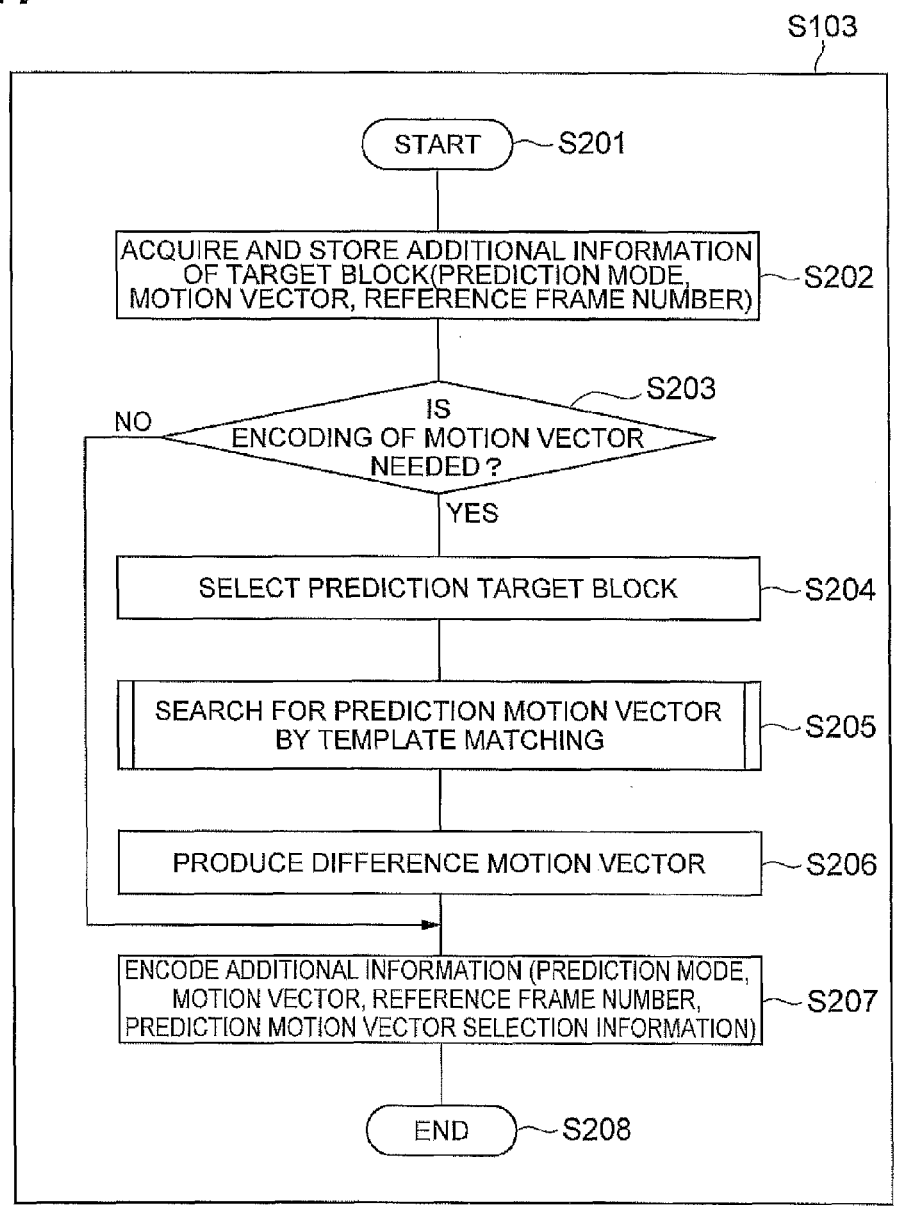
FIG. 17 is a flowchart to describe an example of the procedures of a motion vector prediction method included in the moving image encoding method of FIG. 16.

FIG. 17 is an example flowchart illustrating the detailed procedures of producing a prediction motion vector and an additional information encoding method in step 103 that are carried out by the motion vector predictor 114.

The memory 201 stores the input additional information, i.e., the prediction mode, the motion vector, and the reference frame number (step 202).

Then, the prediction candidate block selector 202 determines whether encoding of the motion vector is needed or not based on the prediction mode of the target block. If encoding of the motion vector is not needed (intra-picture prediction, skip prediction, or template matching prediction), the flow proceeds to step 207, if encoding of the motion vector is needed, the flow proceeds to step 204 (step 203). Subsequently, the prediction candidate block selector 202 selects a prediction target block used for motion vector prediction (step 204). The description of the selection method of a prediction target block is omitted herein since it is already illustrated in FIG. 3 and FIG. 4. The selected block information is added into the additional information as prediction vector selection information.

The prediction motion vector searcher 203 processes the motion vector of the prediction target block so as to produce a prediction motion vector (step 205). The processing method of the motion vector is described later.

The difference unit 204 finds the differences between the respective components of the motion vector of the target block and the prediction motion vector so as to calculate a difference motion vector (step 206).

The produced additional information (the prediction mode, the reference frame number, the difference motion vector, and the prediction motion vector selection information) is encoded by the entropy encoder 111 (step 207).

Figure 18:
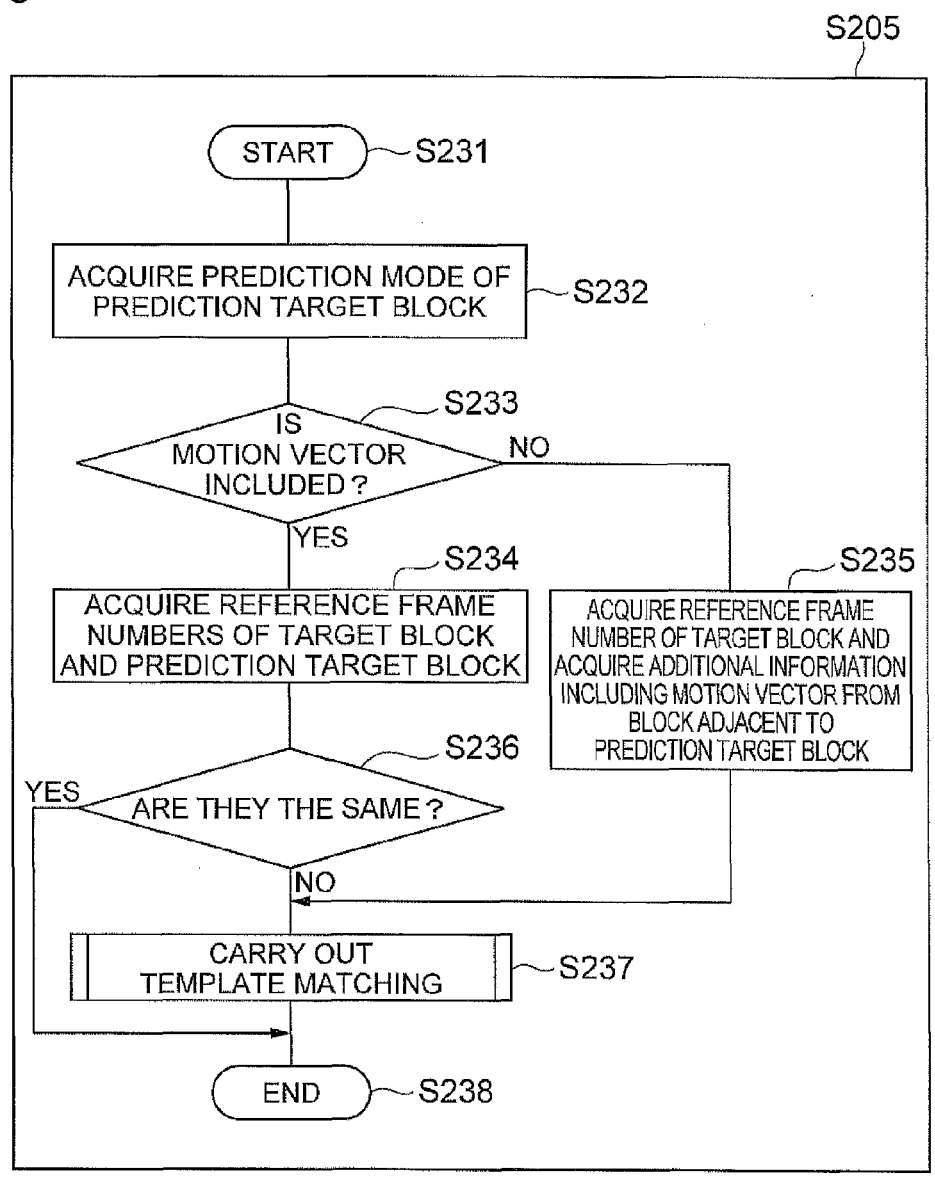
FIG. 18 is a flowchart to describe the procedures of motion vector search processing with template matching.

FIG. 18 is a flowchart illustrating an example of the detailed procedures of a motion vector processing method (a prediction motion vector search method) in step 205 that is carried out by the separator 206 and the prediction motion vector searcher 203.

First, the prediction motion vector searcher 203 acquires the prediction mode of the prediction target block (step 232). Then, the prediction motion vector searcher 203 determines whether the prediction target block has the motion vector or not based on the prediction mode (step 233).

If the prediction target block does not have the motion vector, the separator 206 acquires the reference frame number of the target block and the prediction motion vector searcher 203 acquires the additional information including the motion vector from a block adjacent to the prediction target block from the memory 201, and the flow proceeds to step 237 (step 235).

If the prediction target block has the motion vector, the determiner 231 acquires the reference frame numbers of the target block and the prediction target block (step 234), and further determines whether they are the same or not (step 236). The switcher 232 is controlled in such a manner that, if the two reference frame numbers are the same, the switcher 232 ends the process after setting the motion vector of the prediction target block as a prediction motion vector (step 238), if they are not the same, the flow proceeds to step 237.

The prediction motion vector searcher 203 carries out template matching based on the information obtained in step 234 or step 235 (step 237).

Figure 19:
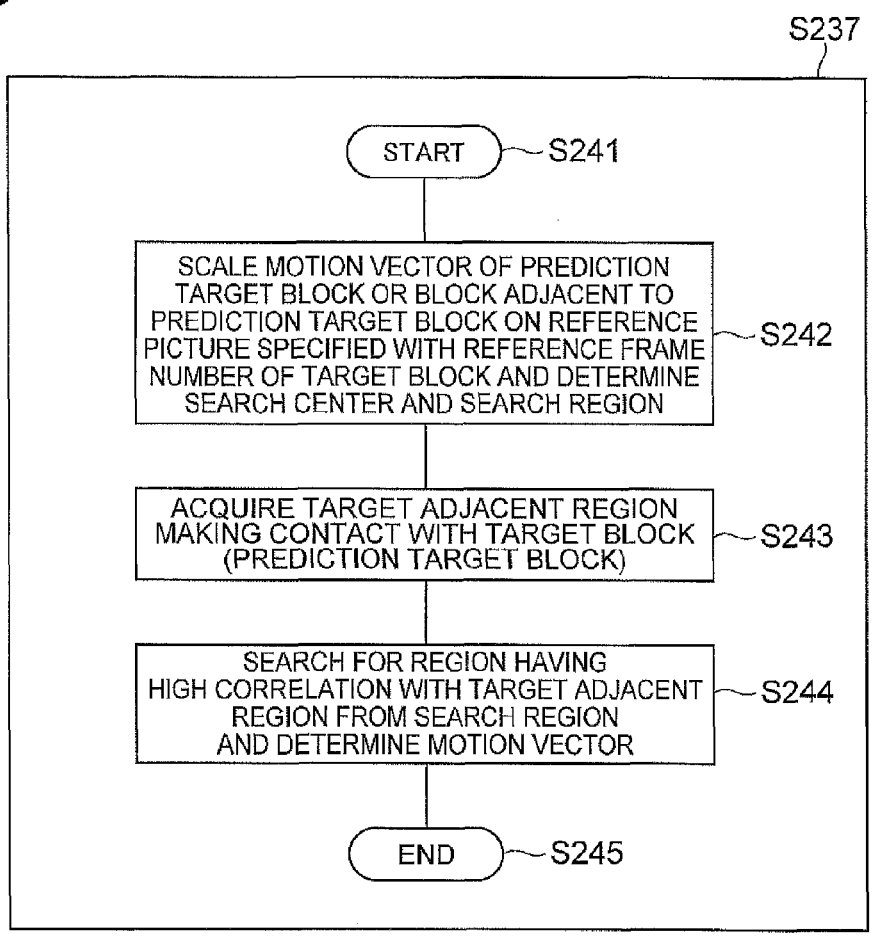
FIG. 19 is a flowchart to describe the procedure of template matching processing.

FIG. 19 is a flowchart illustrating an example of the detailed procedures of a template matching method in step 237 that is carried out by the template matcher 233.

The search region setter 240, first, scales the motion vector of the prediction target block or a block adjacent to the prediction target block on the reference picture specified with the reference frame number of the target block, and determines a search center and a search region. The description of the scaling method of a motion vector is omitted herein since it is already illustrated in FIG. 7.

The target adjacent region acquisition unit 241 acquires a target adjacent region (template region) adjacent to the target block or the prediction target block from the frame memory 104.

The prediction adjacent region 242 and the candidate prediction region selector 243 search for a region having a determined level of correlation, such as high correlation, with the target adjacent region from the search region. Then, the spatial displacement amount between the detected signal region and the template region is set as a prediction motion vector. Since the details of the setting method of a search region for template matching and the detection method of a signal region resembling the template region are already described by using FIG. 8 to FIG. 11, descriptions thereof are omitted herein. Different examples of the "the case that a prediction signal of a target prediction block is produced by template matching" described in FIG. 30 and FIG. 31 are also applicable. Furthermore, if step 261 in FIG. 31 is replaced with S205, "the case that a prediction signal of a target prediction block is produced by template matching" can also be handled in step 205. "The different example of prediction target block selection processing" described by using FIG. 12 and FIG. 13 is applicable to the moving image encoding method.

In this way, with the motion vector prediction method of the present embodiment, a prediction motion vector can be corrected to a motion vector with respect to a reference image specified with a reference frame number of a target block by using template matching. As a result, there is an effect that a difference motion vector value becomes small and encoding efficiency of a difference motion vector improves.

Figure 20:
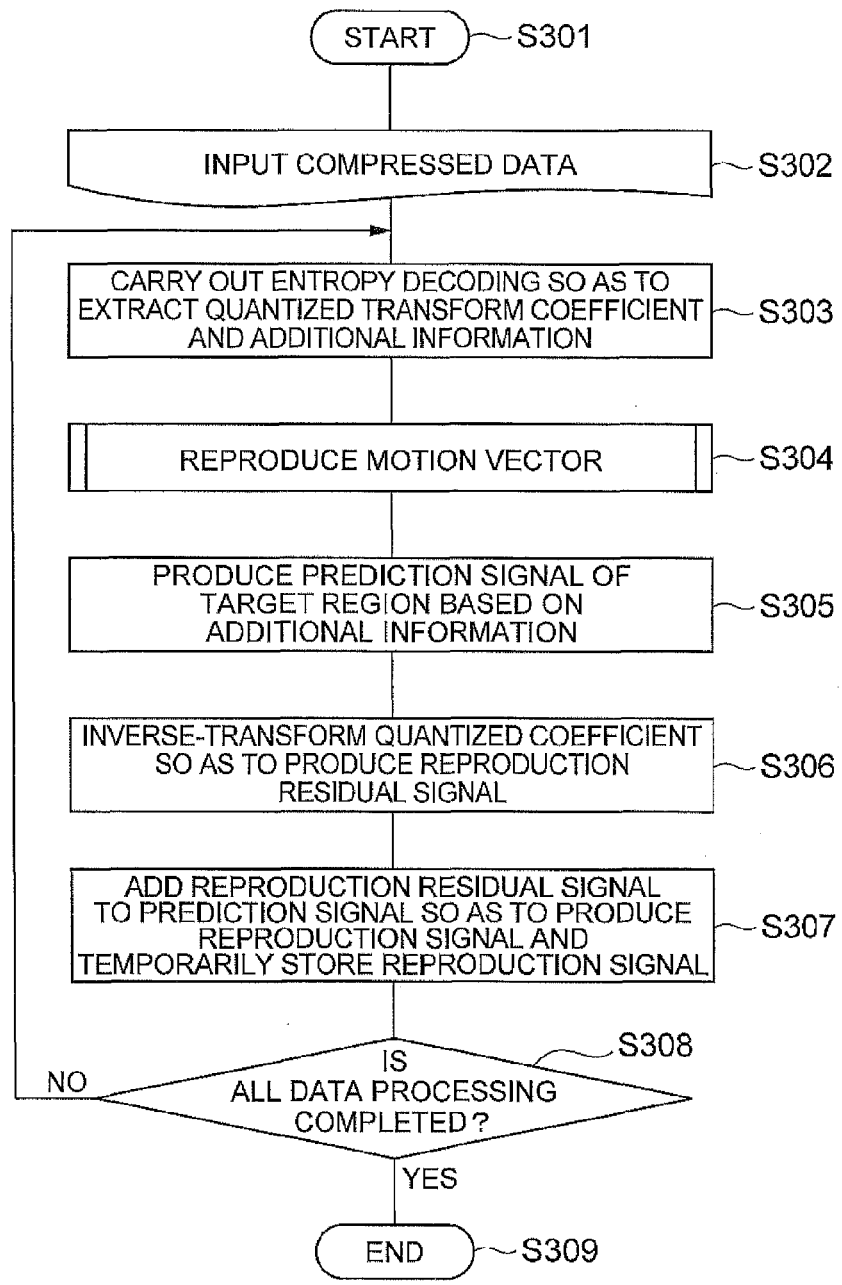
FIG. 20 is a flowchart illustrating the procedures of a moving image decoding method according to the present embodiment.

Next, by using FIG. 20, a moving image decoding method in the moving image decoder 300 according to motion vector prediction processing of the present embodiment is described. First, compressed compressed data is input through the input terminal 301 (step 302). Then, the entropy decoder 302 carries out entropy decoding on the compressed data so as to extract a quantized transform coefficient and additional information (step 303).

The motion vector predictor 307 produces a prediction motion vector and adds the prediction motion vector to a difference motion vector included in the additional information so as to decode a motion vector (step 304). The detail of step 304 is described later.

Based on the reproduced motion vector and the additional information (a prediction mode, a reference frame number), the prediction signal generator 103 produces a prediction signal (step 305).

Meanwhile, the quantized transform coefficient is inverse-quantized by the inverse quantizer 303 by using a quantized parameter, and then the inverse transformer 304 carries out an inverse transformation process so as to produce a reproduction residual signal (step 306). Then, the produced prediction signal and the reproduction residual signal are added so as to produce a reproduction signal. This reproduction signal is stored in the frame memory 104 so as to reproduce a subsequent target block (step 307). If there is subsequent compressed data, this process is repeated (step 308), so that once all pieces of data are thoroughly processed, the flow ends (step S309). The flow may return to step S302 if needed so as to take in compressed data.

Figure 21:
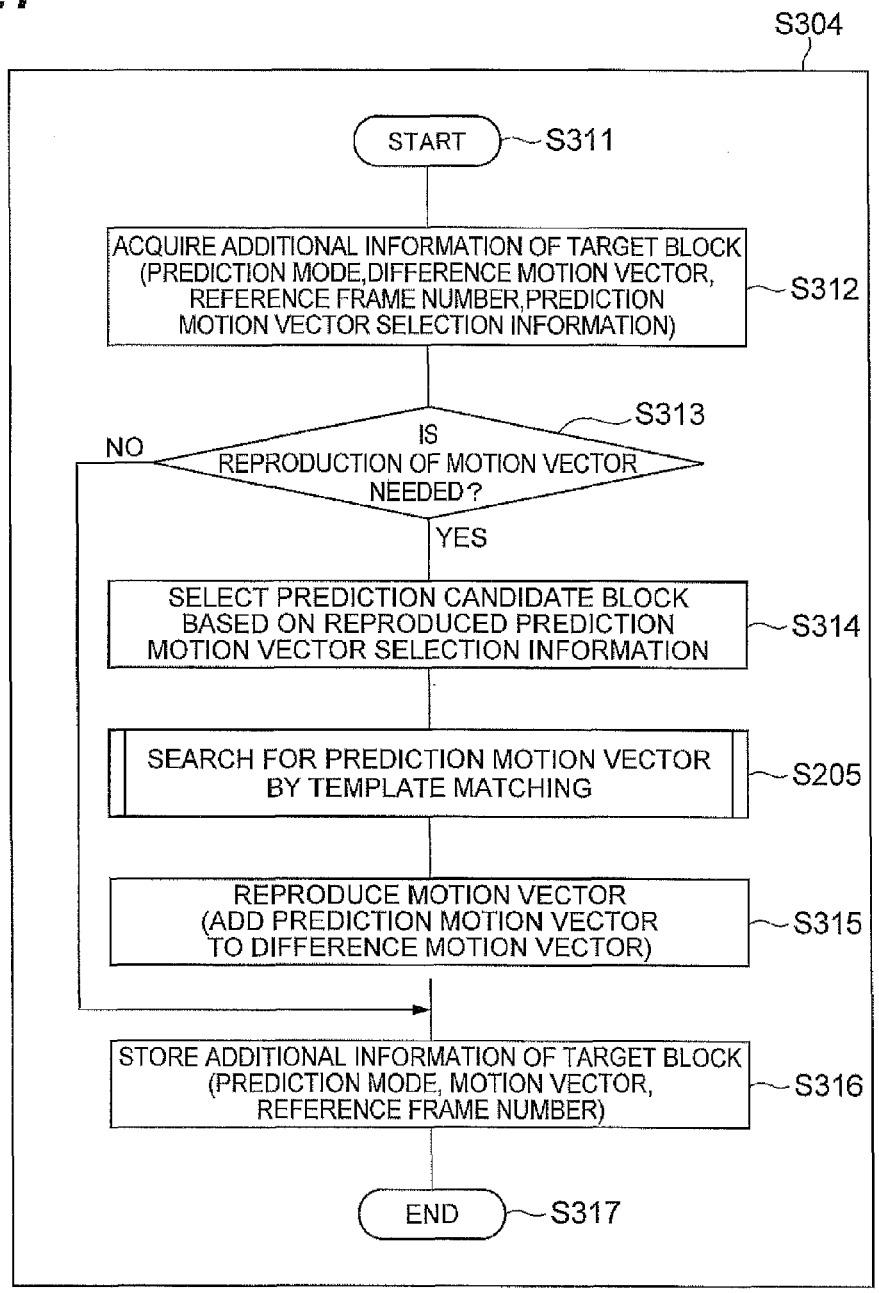
FIG. 21 is a flowchart to describe the procedures of a motion vector prediction method included in the moving image decoding method of FIG. 20.

FIG. 21 is a flowchart illustrating an example of the detailed procedures of producing a prediction motion vector and a decoding method of a motion vector in step 304 that are carried out by the motion vector predictor 307.

The memory 201 stores the input additional information, i.e., the prediction mode, the difference motion vector, the reference frame number, and the prediction motion vector selection information (step 202).

Then, the prediction candidate block selector 202 determines whether reproduction of the motion vector is needed or not based on the prediction mode of the target block. If reproduction of the motion vector is not needed (intra-picture prediction, a skip mode, or template matching prediction), the flow proceeds to step 316, if producing of the motion vector is needed, the flow proceeds to step 314 (step 313). Subsequently, the prediction candidate block selector 202 selects a prediction target block used for motion vector prediction based on the reproduced prediction motion vector selection information (step 314). The description of the selection method of a prediction target block is omitted herein since it is already illustrated in FIG. 3 and FIG. 4. The selected block information is added into the additional information as prediction vector selection information.

The prediction motion vector searcher 203 processes the motion vector of the prediction target block so as to produce a prediction motion vector (step 205). Since the processing method of a motion vector is already described by using the examples of FIG. 18, FIG. 19 and FIG. 8 to FIG. 11, description thereof is omitted herein. Here, "the case that a prediction signal of a target prediction block is produced by template matching" described in the examples of FIG. 30 and FIG. 31, and "the different example of prediction target block selection processing" described by using the examples of FIG. 12 and FIG. 13 are also applicable to the moving image decoding method.

The adder 204 finds the differences between the respective components of the difference vector of the target block and the prediction motion vector so as to reproduce a motion vector (step 315).

The reproduced motion vector is stored in the memory 201 together with other additional information (the prediction mode, the reference frame number) (step 317).

The moving image encoding and decoding system can be provided as instructions in the form of a computer program stored in a non-transitory recording medium. Instructions in the form of computer software, firmware, data or any other form of computer code and/or computer program readable by a computer within the moving image encoding and decoding system may be stored in the non-transitory recording medium. Examples of the non-transitory recording medium include record media including floppy disks, CD-ROMs, DVDs, and ROMs, and semiconductor memories.

Figure 22:
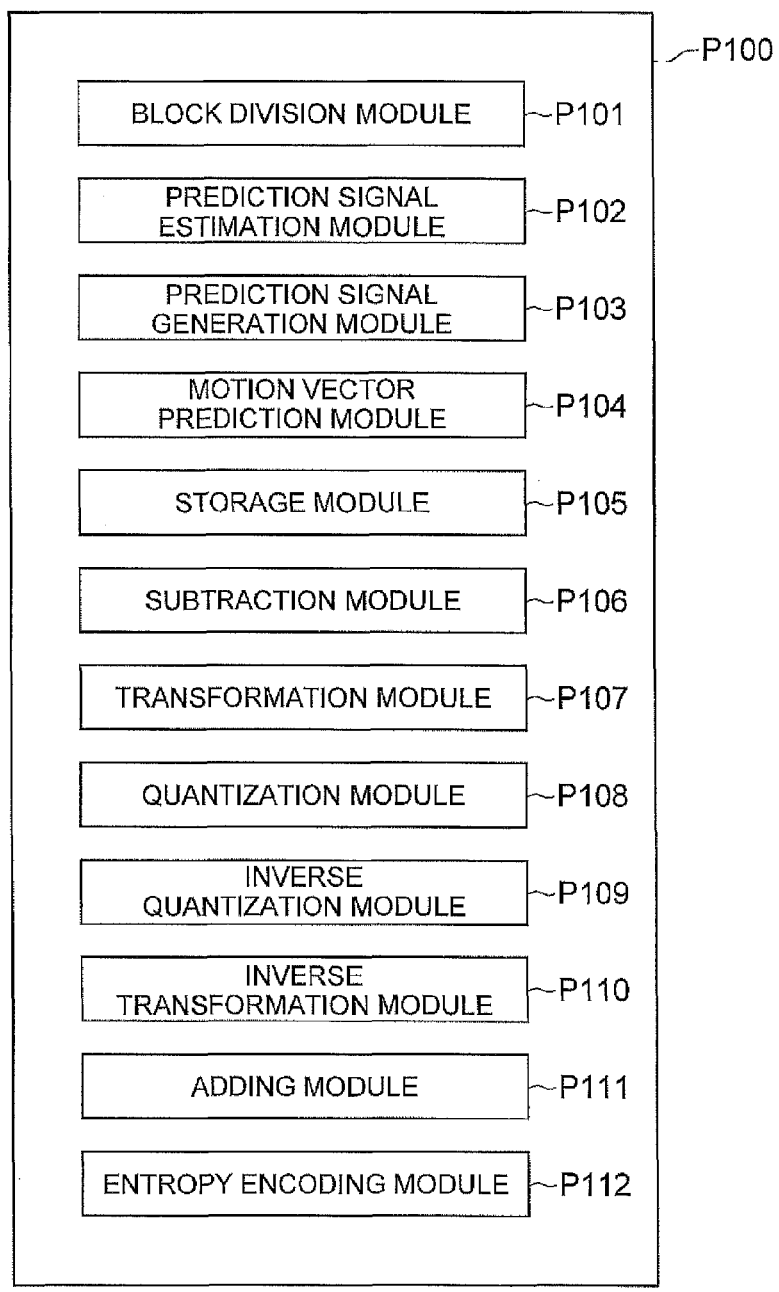
FIG. 22 is a block diagram illustrating the modules of a program capable of executing the moving image encoding method according to the present embodiment.
Figure 23:
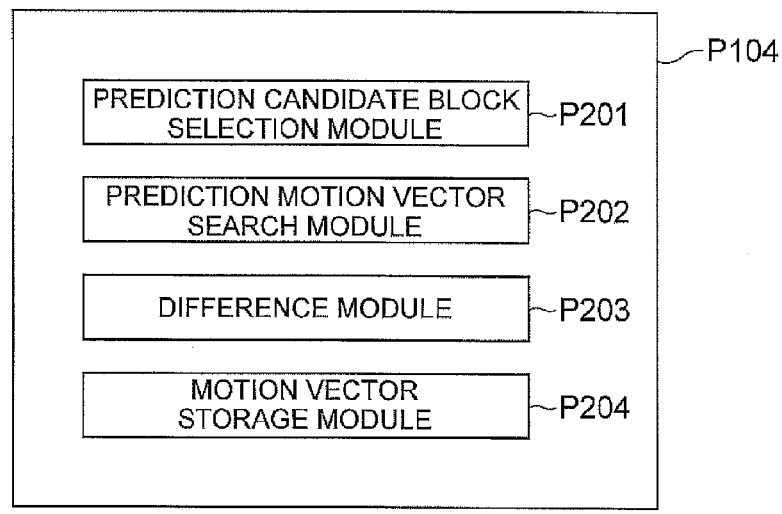
FIG. 23 is a block diagram illustrating a motion vector prediction module included in the modules of FIG. 22.
Figure 24:
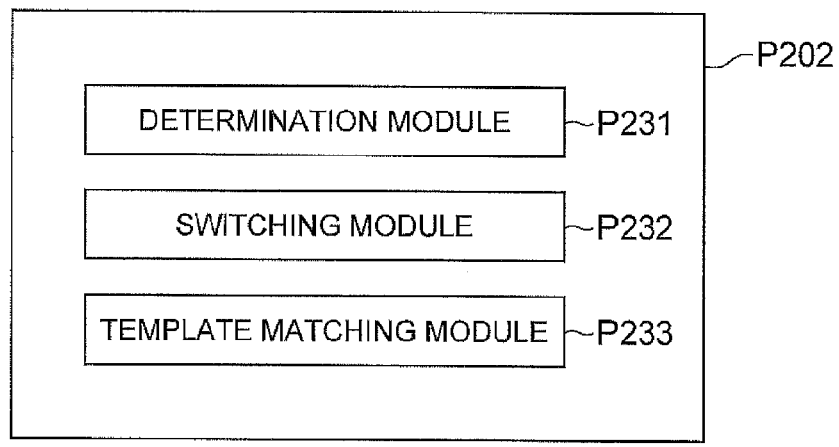
FIG. 24 is a block diagram illustrating a prediction motion vector search module included in the modules of FIG. 23.
Figure 25:
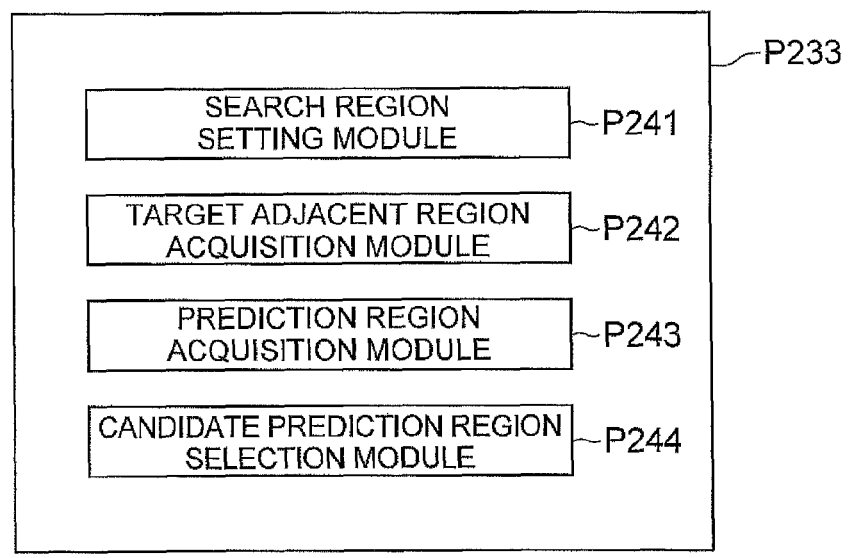
FIG. 25 is a block diagram to describe a template matching module included in the modules of FIG. 24.

FIG. 22 is a block diagram illustrating an example of the modules of the moving image encoding and decoding system capable of executing the moving image encoding method. A moving image encoding program P100 includes a block division module P101, a prediction signal estimation module P102, a prediction signal generation module P103, a motion vector prediction module P104, a storage module P105, a subtraction module P106, a transformation module P107, a quantization module P108, an inverse quantization module P109, an inverse transformation module P110, an adding module P111, and an entropy encoding module P112. The motion vector prediction module P104 includes, as illustrated in the example of FIG. 23, a prediction candidate block selection module P201, a prediction motion vector search module P202, a difference module P203, and a motion vector storage module P204. In addition, as illustrated in the example of FIG. 24, the prediction motion vector search module P202 includes a determination module P231, a switching module 232, and a template matching module P233. As illustrated in the example of FIG. 25, the template matching module P233 includes a search region setting module P241, a prediction region acquisition module 243, and a candidate prediction region selection module.

The functions realized by executing each module described above are the same as the functions of the moving image encoding device 100 described above. In other words, the functions of the respective modules of the moving image encoding program P100 are the same as the functions of the block divider 102, the prediction signal estimation device 113, the prediction signal generator 103, the motion vector predictor 114, the frame memory 104, the subtractor 105, the transformer 106, the quantizer 107, the inverse quantizer 108, the inverse transformer 109, the adder 110, the entropy encoder 111, the prediction candidate block selector 202, the prediction motion vector searcher 203, the difference unit 204, the memory 210, the determiner 231, the switcher 232, the template matcher 233, the search region setter 240, the target adjacent region acquisition unit 241, the prediction adjacent region acquisition unit 242, and the candidate prediction region selector candidate 243.

Figure 26:
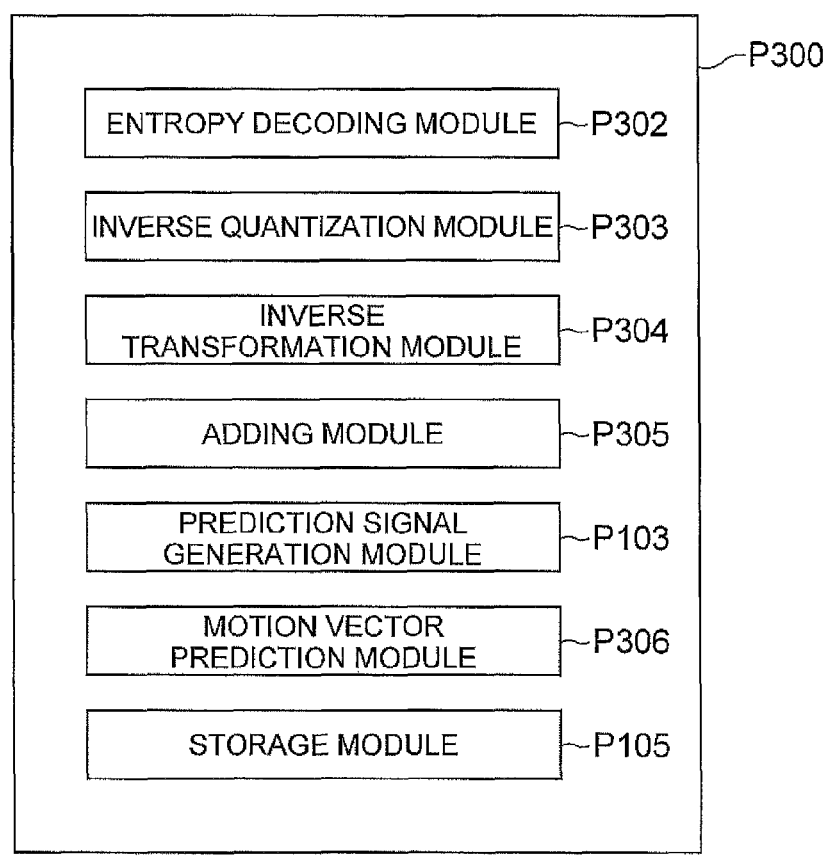
FIG. 26 is a block diagram illustrating the modules of a program capable of executing the moving image decoding method according to the present embodiment.
Figure 27:
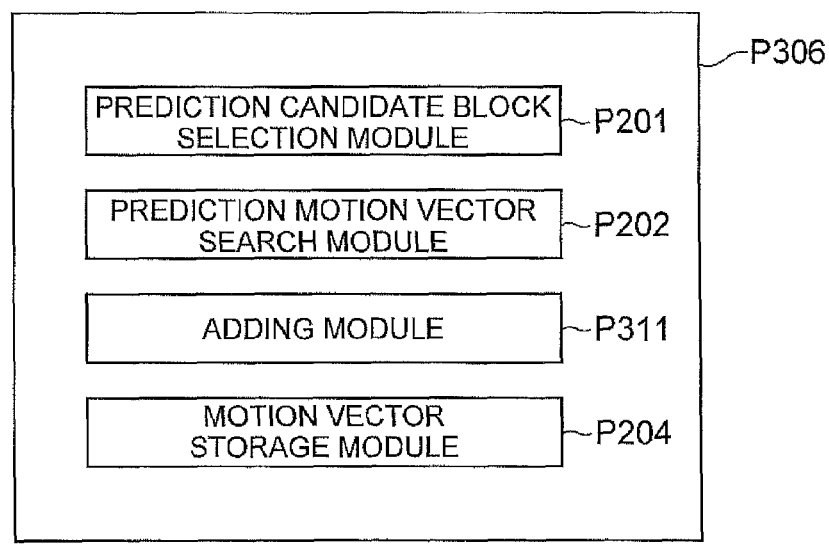
FIG. 27 is a block diagram illustrating a motion vector prediction module included in the modules of FIG. 26.

FIG. 26 is a block diagram illustrating an example of the modules of a program capable of executing the moving image decoding method. A moving image decoding program P300 includes an entropy decoding module P302, an inverse quantization module P303, an inverse transformation module P304, an adding module P305, the prediction signal generation module 103, a motion vector prediction module P306, and the storage module P105. In addition, as illustrated in the example of FIG. 27, the motion vector prediction module P306 includes the prediction candidate block selection module P201, the prediction motion vector search module P202, an adding module P311, and the motion vector storage module P204.

The functions realized by executing each module described above are the same as those of the components included in the moving image decoding device 300 described above. In other words, the functions of the respective modules of the moving image decoding program P300 are the same as the functions of the entropy decoder 302, the inverse quantizer 303, the inverse transformer 304, the adder 305, the prediction signal generator 103, the motion vector predictor 307, the frame memory 104, the prediction candidate block selector 202, the prediction motion vector searcher 203, the adder 312, and the memory 201.

The moving image encoding program P100 or the moving image decoding program P300 both of which are structured in this way are stored in a recording medium 10 and executed by a computer described later.

Figure 28:
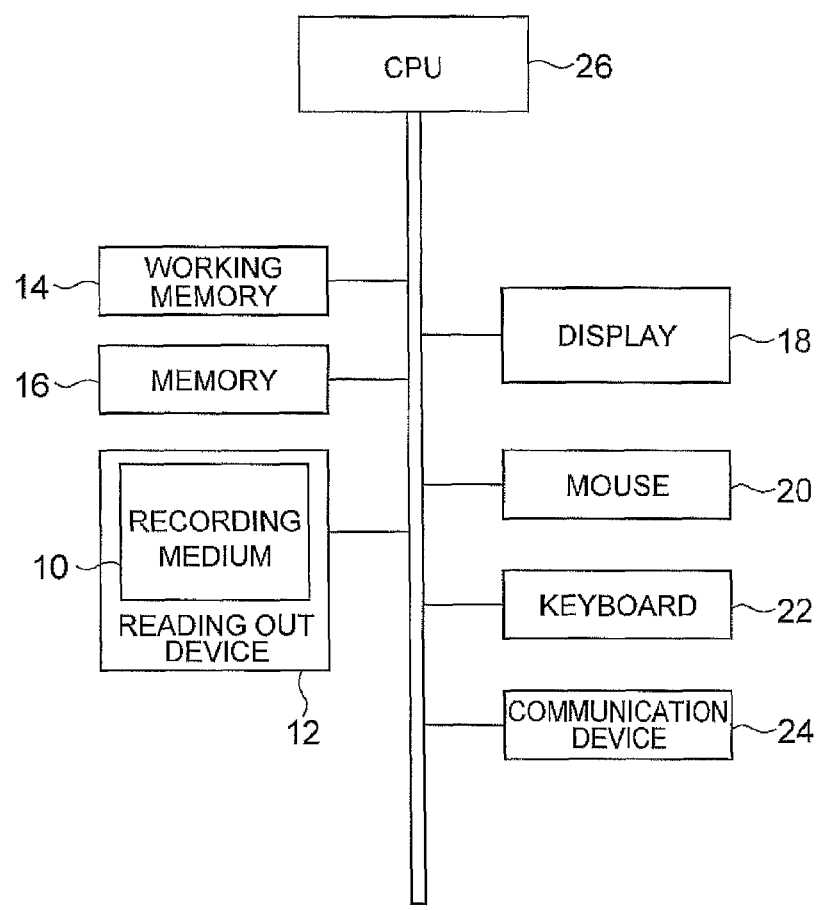
FIG. 28 is a diagram illustrating a hardware configuration of a computer for executing a program stored in a recording medium.
Figure 29:
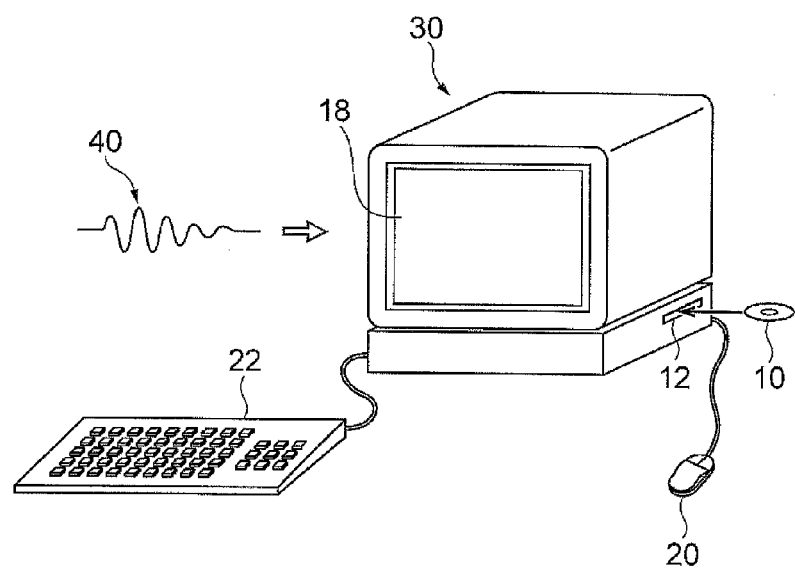
FIG. 29 is a perspective view of the computer for executing the program stored in the recording medium.

FIG. 28 is a diagram illustrating an example hardware configuration of a computer for executing the program recorded in the recording medium. FIG. 29 is a perspective view of the example computer for executing the program stored in the recording medium. In this regard, one that executes a program stored in a recording medium is not limited to the computer. DVD players, set top boxes, cellphones, and the like that include a CPU and software for processing and controlling may be used.

As illustrated in FIG. 28, a computer 30 includes a reading out device 12 such as a floppy disk drive, a CD-ROM drive device, and a DVD drive device. The computer 30 also includes or is in communication with a non-transitory computer readable storage medium that may include a working memory (such as RAM) 14 including a resident operating system, a non-transitory memory 16 that stores a program stored in the recording medium 10, a display device 18 such as a display, a mouse 20 and a keyboard 22 both of which are input devices, a communication device 24 that transmits and receives data and the like, and a CPU 26 (or processor) that controls the execution of the program. In one example, upon insertion of the recording medium 10 into the reading out device 12, the computer 30 becomes accessible to the moving image encoding and decoding system and moving image encoding and decoding programs stored in the recording medium 10 from the reading out device 12. With the moving image encoding and decoding system and the moving image encoding and decoding programs, the computer 30 can operate as the moving image encoding device or the moving image decoding device according to the present embodiments.

As illustrated in FIG. 29, the moving image encoding program and the moving image decoding program may be provided through a network as a computer data signal 40 superimposed on a carrier wave. In this case, the computer 30 stores the moving image encoding program or the moving image decoding program that is received by the communication device 24 to the non-transitory computer readable storage medium, such as the non-transitory memory 16, and can execute the moving image encoding program or the moving image decoding program.

Next, the operations and effects of the moving image encoding device 100 and the moving image decoding device 300 of the present embodiment are described.

In the moving image encoding device 100 of the present embodiment, the frame memory 104 stores a plurality of already reproduced images that have been encoded as reference images, the block divider 102 divides an input image into a plurality of regions, the prediction signal estimator 113 searches for a region having a determined level of correlation, such as high correlation, with a target region that is the target of processing in the plurality of divided regions from the plurality of reference images stored in the frame memory 104 and produces a motion vector.

The prediction signal generator 103 produces a prediction signal of the target region based on a reference frame number specifying the reference image searched by the prediction signal estimator 113 and the motion vector specifying the spatial positional relationship between the target region that is the processing target and the region searched by the prediction signal estimator 113.

The motion vector predictor 114 produces a prediction motion vector from one or more already encoded motion vectors and produces a difference motion vector between the motion vector produced by the prediction signal estimator 113 and the prediction motion vector.

The subtractor 105 produces a residual signal between the prediction signal of the target region and a target pixel signal of the target region, and an encoding processing unit, or encoding module, composed of the transformer 106, the quantizer 107, and the entropy encoder 111 encodes the residual signal, the reference frame number, and the difference motion vector produced by the motion vector predictor 114.

Meanwhile, a restoring processing unit composed of the inverse quantizer 108 and the inverse transformer 109 restores the residual signal encoded by the encoding processing unit, and thereafter adds the restored signal to the prediction signal produced by the prediction signal generator 103 so as to produce a reproduction image and stores the reproduction image in the frame memory 104 as a reference image.

The operation of the motion vector predictor 114 is further described below with reference to FIG. 8. The above-described motion vector predictor 114 selects one region (e.g., the prediction target block 502 of FIG. 4) from already encoded regions, when the selected region does not have a reference frame number or the reference frame number of the target region and the reference frame number of the selected region are different, searches for a region having a determined level of correlation, such as high correlation with a template region (e.g., the target adjacent region 501T adjacent to the target block 501) composed of already reproduced pixel signals located around the target region (the target block 501) from a reference image specified with the reference frame number associated with the target region, and produces a prediction motion vector (the motion vector 602P) based on the spatial positional relationship between the searched region (the prediction adjacent region 501M) and the template region (target adjacent region 501T).

In this regard, in addition to setting the target adjacent region 501T composed of the already reproduced pixel signals and located adjacent to the target region as the template region, the target adjacent region 502T composed of the already reproduced adjacent pixel signals and located adjacent to a region (the prediction target block 502) selected by the motion vector predictor 114 may be set as the template region, as illustrated in FIG. 11.

According to this invention, a region having a determined level of correlation, such as high correlation with a template region composed of already reproduced pixel signals located around a target region is searched from a reference image specified with a reference frame number associated with the target region, and a prediction motion vector can be produced based on a spatial positional relationship between the searched region and the template region. Consequently, even when the motion vector of the already reproduced prediction target block adjacent to the target region is zero or when a prediction method that does not have the motion vector is used, motion vector prediction in the target region is efficiently performed and encoding efficiency can be improved.

In the moving image encoding device 100 of the present embodiment, the prediction signal generator 103 functions as prediction signal combining means, which may also be referred to as a prediction signal combining unit. The prediction signal generator 103 searches for one or more prediction adjacent regions (the prediction adjacent region 501M) having a determined level of correlation, such as high correlation with a target adjacent region (the target adjacent region 501T) composed of already reproduced adjacent pixel signals and located adjacent to a target region (the target block 501) from a plurality of reference images, and processes a prediction signal of the target region based on one or more prediction adjacent regions. For example, the prediction signal generator 103 detects N prediction adjacent regions and processes a prediction signal by averaging the N candidate prediction signals.

The prediction motion vector predictor 114, furthermore, stores motion vectors specifying the spatial positional relationship between the prediction adjacent region (the prediction adjacent region 501M) searched by the prediction signal generator 103 and the target adjacent region (the prediction adjacent region 501T), one motion vector being stored for each of the plurality of reference images. When the prediction signal of the selected region is produced by the prediction signal generator 103, the motion vector corresponding to the reference frame number of the target region in the stored motion vectors is set as a prediction motion vector.

According to this present invention, when a prediction signal of a prediction target region is produced by template matching, template matching processing efficiency can be improved by using a motion vector detected in the template matching.

In the moving image decoding device 300 of the present embodiment, the entropy decoder 302 decodes encoded data of a difference motion vector, a reference frame number and a residual signal of a target region that is the processing target from compressed data input through the input terminal 301.

The inverse quantizer 303 and the inverse transformer 304 restore a reproduction residual signal from the encoded data of the residual signal, and the adder 305 adds a prediction signal produced by the prediction signal generator 103 to the restored reproduction residual signal so as to restore a pixel signal of the target region, and stores the restored pixel signal in the frame memory 104. The frame memory 104 stores a plurality of already reproduced images as reference images.

Meanwhile, the motion vector predictor 307 produces a prediction motion vector from one or more already restored motion vectors and adds the prediction motion vector to the difference motion vector decoded by the entropy decoder 302 so as to restore a motion vector. The prediction signal generator 103 produces a prediction signal of the target region based on the motion vector restored by the motion vector predictor 307 and the reference frame number of the target region.

More particularly, the motion vector predictor 307 selects one region (e.g., the prediction target block 502 of FIG. 4) from already encoded regions, when the selected region does not have a reference frame number or the reference frame number of the target region and the reference frame number of the selected region are different, searches for a region having a determined level of correlation, such as high correlation with a template region (e.g., the target adjacent region 501T adjacent to the target block 501) composed of already reproduced pixel signals located around the target region (the target block 501) from a reference image specified with the reference frame number associated with the target region, and produces a prediction motion vector (the motion vector 602P) based on the spatial positional relationship between the searched region (the prediction adjacent region 501M) and the template region (target adjacent region 501T).

According to this invention, a region having a determined level of correlation, such as high correlation with a template region composed of already reproduced pixel signals located around a target region is searched from a reference image specified with a reference frame number associated with the target region, and a prediction motion vector can be produced based on a spatial positional relationship between the searched region and the template region. Therefore, even when the motion vector of the already reproduced prediction target block adjacent to the target region is zero or when a prediction method that does not have the motion vector is used, motion vector prediction in the target region is efficiently carried out and encoding efficiency can be improved. As a result, data encoded in such a manner can be decoded.

In this regard, in addition to setting the target adjacent region 501T composed of the already reproduced pixel signals and located adjacent to the target region as the template region, the target adjacent region 502T composed of the already reproduced adjacent pixel signals and located adjacent to a region (the prediction target block 502) selected by the motion vector predictor 114 may be set as the template region, as illustrated in FIG. 11.

In the moving image decoding device 300 of the present embodiment, the prediction signal generator 103 functions as prediction signal combining means, which may also be referred to as a prediction signal combining module. The prediction signal generator 103 searches for one or more prediction adjacent regions (the prediction adjacent region 501M) having a determined level of correlation, such as high correlation with a target adjacent region (the target adjacent region 501T) composed of already reproduced adjacent pixel signals and located adjacent to a target region (the target block 501) from a plurality of reference images, and processes a prediction signal of the target region based on the one or more prediction adjacent regions. For example, the moving image decoding device 300 detects N prediction adjacent regions and produces a prediction signal by averaging the N candidate prediction signals.

The prediction motion vector predictor 307, furthermore, stores motion vectors specifying the spatial positional relationship between the prediction adjacent region (the prediction adjacent region 501M) searched by the prediction signal generator 103 and the target adjacent region (the prediction adjacent region 501T), one motion vector being stored for each of the plurality of reference images.

When the prediction signal of the selected region is produced by the prediction signal generator 103, the motion vector corresponding to the reference frame number of the target region in the stored motion vectors is set as a prediction motion vector.

According to this invention, when a prediction signal of a prediction target region is produced by template matching, template matching processing efficiency can be improved by using a motion vector detected in the template matching.

In addition, an image processing system can be structured that includes the moving image encoding device 100 and the moving image decoding device 300 of the present embodiment. In this case, the system is structured in such a manner that data encoded by the moving image encoding device 100 can be decoded by the moving image decoding device 300. The moving image encoding device 100 and the moving image decoding device 300 may be structured as an image processing system in which they connect with each other through a network or may be included in a device (e.g., a computer, a mobile terminal, and the like).

We claim:

1. A moving image encoding device comprising:
   a processor;
   a region division unit executable by the processor to divide an input image into a plurality of input image regions;
   a memory in communication with the processor and configured to store a plurality of already reproduced images as reference images;
   a motion estimation unit executable by the processor to search for a region having a determined level of correlation with a target region included in the input image, the region being a processing target included in a plurality of reference regions from the reference images stored in the memory, the motion estimation unit further executable by the processor to produce a motion vector of the target region;
   a prediction signal generation unit executable by the processor to produce a prediction signal of the target region based on a reference frame number of the target region specifying a reference image included in the reference images that is searched by the motion estimation unit, and the motion vector specifying a spatial positional relationship between the target region and a searched region of the reference image;
   a motion vector prediction unit executable by the processor to produce a prediction motion vector from one or more encoded motion vectors, and to produce a difference motion vector indicative of a difference between the motion vector produced by the motion estimation unit and the prediction motion vector;
   a residual signal generation unit executable by the processor to produce a residual signal indicative of a difference between the prediction signal of the target region and a target pixel signal of the target region;
   an encoding unit executable by the processor to encode the residual signal, the reference frame number, and the difference motion vector produced by the motion vector prediction unit; and
   a restoration unit executable by the processor to decode the encoded residual signal, and thereafter add the decoded residual signal to the prediction signal to produce a reference image, the restoration unit further executable by the processor to store the reference image in the memory; wherein
   the motion vector prediction unit is further executable by the processor to select a first region from previously encoded regions, and in response to the selected first region not having a reference frame number, or the reference frame number of the target region and the reference frame number of the first region being different, the motion vector prediction unit is further executable by the processor to search for and select a second region instead of said first region, said second region being selected from a search region established within said previously encoded regions based on a scaled form of the prediction motion vector, said second region selected due to having a determined level of correlation with a template region, the template region located around the target region and being composed of pixel signals already reproduced from the reference image specified with the reference frame number of the target region; and
   the motion vector prediction unit is further executable by the processor to produce the prediction motion vector based on a spatial positional relationship between the template region and the first region, or produce the prediction motion vector based on a spatial positional relationship between the template region and the second region, when the second region is selected by the motion vector prediction unit.

2. The moving image encoding device according to claim 1, wherein the template region is set to a target adjacent region composed of already reproduced pixel signals, and the target adjacent region is located adjacent to the target region.

3. The moving image encoding device according to claim 1, wherein the template region is set to a target adjacent region composed of already reproduced adjacent pixel signals, and the template region is located adjacent to the first region or the second region selected by the motion vector prediction unit.

4. The moving image encoding device according to claim 1, wherein the prediction generation unit further includes a prediction signal combining unit executable to search for one or more prediction adjacent regions having a determined level of correlation with a target adjacent region composed of adjacent pixel signals already reproduced from the reference images, the target adjacent region located adjacent to the target region, and the prediction signal combining unit further executable to process the prediction signal of the target region based on the one or more prediction adjacent regions,
   the motion vector prediction unit further executable to store motion vectors, each of the motion vectors specifying a spatial positional relationship between a prediction adjacent region searched by the prediction signal combining unit and the target adjacent region, one motion vector being stored for each of the reference images, and in response to a region prediction signal of the selected first region or second region being produced by the prediction signal combining unit, the motion vector prediction unit further executable to set one of the motion vectors in the stored motion vectors as the prediction motion vector, wherein the one of the motion vectors is included in the reference frame corresponding to the reference frame number of the target region.

5. A moving image decoding device comprising:
a processor;
a data decoding unit executable by the processor to decode encoded data that is compressed, the encoded data including a difference motion vector, a reference frame number, and a residual signal of a target region that is a processing target;
a memory configured to store a plurality of already reproduced images as reference images;
a residual signal restoration unit executable by the processor to restore a reproduction residual signal from the encoded data of the residual signal;
a motion vector prediction unit executable by the processor to produce a prediction motion vector from one or more restored motion vectors and add the difference motion vector decoded by the data decoding unit to the prediction motion vector so as to restore a motion vector;
a prediction signal generation unit executable by the processor to produce a prediction signal of the target region based on the motion vector restored by the motion vector prediction unit and a reference frame number of the target region; and
an image restoration unit executable by the processor to add the prediction signal to the reproduction residual signal so as to restore a pixel signal of the target region;
wherein the motion vector prediction unit is further executable by the processor to select a first region from previously decoded regions, and in response to the selected first region not having a reference frame number, or the reference frame number of the target region and a reference frame number of the selected first region being different, the motion vector prediction unit is further executable to search for and select a second region instead of the first region, the second region selected from a search region established within the previously decoded regions based on a scaled form of the prediction motion vector, the second region selected due to having a determined level of correlation with a template region, the template region located around the target region and being composed of pixel signals already reproduced from a reference image specified with the reference frame number associated with the target region; and
the motion vector prediction unit further executable by the processor to produce the prediction motion vector based on a spatial positional relationship between the template region and the first region, or produce the prediction motion vector based on a spatial positional relationship between the template region and the second region, when the second region is selected by the motion vector prediction unit.

6. The moving image decoding device according to claim 5, wherein the template region is set to a target adjacent region composed of already reproduced pixel signals, and the target adjacent region is located adjacent to the target region.

7. The moving image decoding device according to claim 5, wherein the template region is set to a target adjacent region composed of already reproduced adjacent pixel signals, and the target adjacent region is located adjacent to the first or the second region selected by the motion vector prediction unit.

8. The moving image decoding device according to claim 5, wherein the prediction generation unit includes a prediction signal combining unit executable to search for one or more prediction adjacent regions having a determine level of correlation with a target adjacent region composed of adjacent pixel signals already reproduced from the reference images and located adjacent to the target region, the prediction signal combining unit further executable to process the prediction signal of the target region based on the one or more prediction adjacent regions, the motion vector prediction unit further executable to store motion vectors, each of the motion vectors specifying a spatial positional relationship between and the target adjacent region and a prediction adjacent region searched by the prediction signal combining unit, one motion vector being stored for each of the reference images, and the motion vector prediction unit further executable, in response to a region prediction signal of the first region or the second region being produced by the prediction signal combining unit to set one of the motion vectors in the stored motion vectors as the prediction motion vector, wherein the one of the motion vectors is included in the reference image corresponding to the reference frame number of the target region.

9. A moving image encoding method, comprising:
a region division step of dividing an input image into a plurality of input image regions;
a motion estimation step of searching for a region having a determined level of correlation with a target region included in the input image and producing a motion vector of the target region, the region being a processing target in a plurality of reference regions from a plurality of reference images stored in a storage means;
a prediction signal generation step of producing a prediction signal of the target region based on a reference frame number of the target region specifying a reference image included in the reference images that is searched in the motion estimation step, and the motion vector specifying a spatial positional relationship between the target region and a searched region of the reference image;
a motion vector prediction step of producing a prediction motion vector from one or more encoded motion vectors, and producing a difference motion vector indicative of a difference between the motion vector produced in the motion estimation step and the prediction motion vector;
a residual signal generation step of producing a residual signal indicative of a difference between the prediction signal of the target region and a target pixel signal of the target region;
an encoding step of encoding the residual signal, the reference frame number, and the difference motion vector produced in the motion vector prediction step; and
a restoration step of decoding the encoded residual signal, and thereafter adding the decoded residual signal to the prediction signal to produce a reproduction image, and storing the reproduction image in the storage means as a reference image;
wherein the motion vector prediction step further includes:
selecting a first region from previously encoded regions, determining that the selected first region does not have a reference frame number, or the reference frame number of the target region and the reference frame number of the first region are different, in response to the determination, scaling the motion prediction vector, setting a search region based on the scaled motion prediction vector, and searching for and selecting a second region from within the search region, the second region having a determined level of correlation with a template region located around the target region and composed of pixel signals already reproduced from the reference image specified with the reference frame number of the target region, and producing the prediction motion vector based on a spatial positional relationship between the template region and the second region instead of the first region.

10. The moving image encoding method according to claim 9, wherein the prediction signal generation step further includes a prediction signal combining step of searching for one or more prediction adjacent regions having a determined level of correlation with a target adjacent region composed of adjacent pixel signals already reproduced from the reference image, the target adjacent region located adjacent to the target region, and processing the prediction signal of the target region based on the one or more prediction adjacent regions, the motion vector prediction step further includes storing motion vectors, each of the motion vectors specifying a spatial positional relationship between a prediction adjacent region searched in the prediction signal combining step and the target adjacent region, one motion vector being stored for each of the reference images, and setting one of the motion vectors as the prediction motion vector when a region prediction signal of the selected first or second region is produced in the prediction signal combining step, wherein the one of the motion vectors in included in the reference image corresponding to the reference frame number of the target region.

11. A moving image decoding method, comprising:

a data decoding step of decoding encoded data that is compressed, the encoded data including a difference motion vector, a reference frame number, and a residual signal of a target region that is a processing target;

a storage step of storing a plurality of already reproduced images as reference images;

a residual signal restoration step of restoring a reproduction residual signal from the encoded data of the residual signal;

a motion vector prediction step of producing a prediction motion vector from one or more restored motion vectors, and adding the difference motion vector decoded in the data decoding step to the prediction motion vector so as to restore a motion vector;

a prediction signal generation step of producing a prediction signal of the target region based on the motion vector restored in the motion vector prediction step and the reference frame number of the target region; and an image restoration step of adding the prediction signal to the reproduction residual signal so as to restore a pixel signal of the target region, and storing the pixel signal as a reference image in storage means;

wherein the motion vector prediction step further includes:

selecting a first region from previously decoded regions, determining that the selected first region does not have a reference frame number, or that the reference frame number of the target region and the reference frame number of the first region are different, as a result of the determination, scaling the prediction motion vector, setting a search region based on the scaled prediction motion vector, searching for and selecting a second region from within the search region, the second region having a determined level of correlation with a template region, the template region located around the target region and being composed of pixel signals already reproduced from a reference image specified with the reference frame number associated with the target region, the template region being located around the target region; and producing the prediction motion vector based on a spatial positional relationship between the template region and the second region instead of the first region.

12. The moving image decoding method according to claim 11, wherein the prediction generation step further includes a prediction signal combining step of searching for one or more prediction adjacent regions having a determined level of correlation with a target adjacent region composed of adjacent pixel signals already reproduced from the reference images and located adjacent to the target region, and processing the prediction signal of the target region based on the one or more prediction adjacent regions, the motion vector prediction step further includes storing motion vectors, each of the motion vectors specifying a spatial positional relationship between a prediction adjacent region searched in the prediction signal combining step and the target adjacent region, one motion vector being stored for each of the reference images, and setting one of the motion vectors as the prediction motion vector when a region prediction signal of the selected first region or second region is produced in the prediction signal combining step, wherein the one of the motion vectors is included in the reference image corresponding to the reference frame number of the target region.

13. A non-transitory computer readable storage medium for a moving image encoding and decoding system, the computer readable storage medium comprising instructions executed by a computer for moving image encoding, the instructions comprising:

a region division module executed to divide an input image into a plurality of input image regions;

a motion estimation module executed to search for a region having a determined level of correlation with a target region included in the input image, the region being a processing target included in a plurality of reference regions from a plurality of reference images stored in storage means, and to produce a motion vector of the target region;

a prediction signal generation module executed to produce a prediction signal of the target region based on a reference frame number of the target region specifying a reference image included in the reference images that is searched by the motion estimation module, and a motion vector specifying a spatial positional relationship between the target region and a searched region of the reference image;

a motion vector prediction module executed to produce a prediction motion vector from one or more encoded motion vectors and to produce a difference motion vector indicative of a difference between the motion vector produced by the motion estimation module and the prediction motion vector;

a residual signal generation module executed to produce a residual signal indicative of a difference between the prediction signal of the target region and a target pixel signal of the target region;

an encoding module executed to encode the residual signal, the reference frame number, and the difference motion vector produced by the motion vector prediction module; and a restoration module executed to decode the encoded residual signal, and thereafter to add the decoded residual signal to the prediction signal to produce a reproduction image, and to store the reproduction image in the storage means as a reference image;

wherein the motion vector prediction module is further executed to select a first region from encoded regions, and determine if the selected first region includes a reference frame number, or determine if the reference frame number of the target region and the reference frame number of the first region are different, the motion vector prediction module is further executed, when the first region is determined to not have the reference frame number or the reference frame number of the first region is determined as being different from the reference frame number of the target region, to scale the prediction motion vector, set a search region based on the scaled prediction motion vector, and search for and select a second region from within the search region, the second region having a determined level of correlation with a template region located around the target region and being composed of pixel signals already reproduced from the reference image specified with the reference frame number associated with the target region, and wherein the motion vector prediction module is further executed to produce the prediction motion vector based on a spatial positional relationship between the template region and the second region in response to the second region being selected.

14. The computer readable storage medium according to claim 13, wherein the prediction generation module further includes a prediction signal combining module executed to search for one or more prediction adjacent regions having a determined level of correlation with a target adjacent region composed of adjacent pixel signals already reproduced from the reference images, the target adjacent region located adjacent to the target region, and the prediction signal combining module executed to process the prediction signal of the target region based on the one or more prediction adjacent regions, the motion vector prediction module also executed to store motion vectors, each of the motion vectors specifying a spatial positional relationship between a prediction adjacent region searched by the prediction signal combining module and the target adjacent region, one motion vector being stored for each of the plurality of reference images, and in response to a region prediction signal of the selected first region or second region being produced by the prediction signal combining module, the motion vector prediction module is executed to set one of the motion vectors in the stored motion vectors as the prediction motion vector, wherein the one of the motion vectors is included in the reference image corresponding to the reference frame number of the target region.

15. A non-transitory computer readable storage medium for a moving image encoding and decoding system, the computer readable storage medium comprising instructions executed by a computer for moving image decoding, the instructions comprising:

a data decoding module executed to decode encoded data that is compressed, the encoded data including a difference motion vector, a reference frame number, and a residual signal of a target region that is a processing target;

a storage module for storing a plurality of already reproduced images as reference images;

a residual signal restoration module executed to restore a reproduction residual signal from the encoded data of the residual signal;

a motion vector prediction module executed to produce a prediction motion vector from one or more restored motion vectors and add the difference motion vector decoded by the data decoding module to the prediction motion vector so as to restore a motion vector;

a prediction signal generation module executed to produce a prediction signal of the target region based on the motion vector restored by the motion vector prediction module and the reference frame number of the target region; and an image restoration module executed to add the prediction signal to the reproduction residual signal so as to restore a pixel signal of the target region, and to store the pixel signal as a target reference image in storage means; wherein the motion vector prediction module further executed to select a first region from decoded regions, and determine if the selected first region includes a reference frame number, or determine if the reference frame number of the target region and the reference frame number of the selected first region are different, the motion vector prediction module further executed, when the first region is determined to not have the reference frame number or the reference frame number of the first region is determined as being different from the reference frame number of the target region, to scale the prediction motion vector, set a search region based on the scaled prediction motion vector, search for and select a second region from within the search region, the second region having a determined level of correlation with a template region, the template region located around the target region and being composed of pixel signals already reproduced from a reference image specified with the reference frame number associated with the target region, and the motion vector prediction module further executed to produce the prediction motion vector based on a spatial positional relationship between the template region and the second region in response to the second region being selected by the motion vector prediction module.

16. The moving image decoding program according to claim 15, wherein the prediction generation module includes a prediction signal combining module executed to search for one or more prediction adjacent regions having a determined level of correlation with a target adjacent region composed of adjacent pixel signals already reproduced from the reference images, the target adjacent region located adjacent to the target region, and the prediction signal combining module further executed to process the prediction signal of the target region based on the one or more prediction adjacent regions, the motion vector prediction module further executed to store motion vectors, each of the motion vectors specifying a spatial positional relationship between a prediction adjacent region searched by the prediction signal combining module and the target adjacent region, one motion vector being stored for each of the reference images, and the motion vector prediction module further executed to set one of the motion vectors in the stored motion vectors as the prediction motion vector, wherein the one of the motion vectors is included in the reference image corresponding to the reference frame number of the target region.

\* \* \* \* \*